(12) United States Patent
Lamb et al.

(10) Patent No.: US 7,204,192 B2
(45) Date of Patent: Apr. 17, 2007

(54) APPARATUS, SYSTEMS AND METHODS FOR LEVITATING AND MOVING OBJECTS

(75) Inventors: Karl J. Lamb, Sequim, WA (US); Michael T. Sparks, Port Angeles, WA (US); Scott D. Gossage, Port Angeles, WA (US)

(73) Assignee: Magna Force, Inc., Port Angeles, WA (US)

( * ) Notice: Subject to any disclaimer, the term of this patent is extended or adjusted under 35 U.S.C. 154(b) by 120 days.

(21) Appl. No.: 10/421,207

(22) Filed: Apr. 22, 2003

(65) Prior Publication Data

US 2003/0205163 A1 Nov. 6, 2003

Related U.S. Application Data

(63) Continuation-in-part of application No. 10/189,144, filed on Jul. 2, 2002, now Pat. No. 6,899,036, which is a continuation-in-part of application No. 09/898,536, filed on Jul. 2, 2001, now Pat. No. 6,510,799.

(60) Provisional application No. 60/375,220, filed on Apr. 23, 2002.

(51) Int. Cl.
*B61D 9/14* (2006.01)

(52) U.S. Cl. .................. 104/282; 104/281; 104/290; 198/619

(58) Field of Classification Search .............. 104/290, 104/292, 287, 281, 288, 282, 283; 198/619
See application file for complete search history.

(56) References Cited

U.S. PATENT DOCUMENTS

| 3,164,105 | A | * | 1/1965 | Eribacher | 105/27 |
| 3,320,903 | A | | 5/1967 | Knolle | 104/20 |
| 3,346,993 | A | * | 10/1967 | Johnson | 49/409 |
| 3,791,309 | A | | 2/1974 | Baermann | 104/148 MS |
| 3,841,227 | A | * | 10/1974 | Fink | 104/130.02 |
| 3,845,720 | A | | 11/1974 | Bohn et al. | 104/148 MS |
| 4,074,153 | A | | 2/1978 | Baker et al. | 310/12 |
| 4,151,431 | A | | 4/1979 | Johnson | 310/12 |
| 4,215,330 | A | | 7/1980 | Hartman | 335/306 |
| 4,356,772 | A | | 11/1982 | van der Heide | 104/282 |
| 4,486,729 | A | | 12/1984 | Lee | 335/306 |
| 4,600,849 | A | | 7/1986 | Lawson et al. | 310/103 |
| 4,805,761 | A | | 2/1989 | Totsch | 198/619 |

(Continued)

FOREIGN PATENT DOCUMENTS

| DE | 2 300 599 | 7/1974 |
| DE | 199 08 344 A1 | 8/2000 |
| JP | 52-64711 A | 2/1993 |

OTHER PUBLICATIONS

Jasdamun, Anick, "High–Tech Train Travel," *The Associated Press*, Aug. 10, 1998.
Jasdamun, Anick, "Seven Maglev Train Finalists," *The Associated Press*, May 25, 1999.

*Primary Examiner*—Frantz F. Jules
(74) *Attorney, Agent, or Firm*—Seed IP Law Group PLLC

(57) ABSTRACT

Apparatus, systems and methods for levitating and moving objects such as vehicles, doors and windows are shown and described herein. The embodiments incorporate a track with lower rails having lower permanent magnets and the object with upper rails having upper permanent magnets aligned with the lower rails and oriented to oppose the polarity of the lower permanent magnets. Ferrous backing plates may be incorporated behind the lower rails and/or the upper rails. Embodiments may also incorporated a third rail of an electroconductive material, and a driving disc positioned near the third rail. Permanent magnets in the driving disc may be rotated with the driving disc in the presence of the third rail to accelerate the upper rails with respects to the lower rails. The driving disc may be coupled one of the lower rails to maintain a desired alignment with the third rail.

15 Claims, 25 Drawing Sheets

U.S. PATENT DOCUMENTS

| | | | |
|---|---|---|---|
| 4,877,983 A | 10/1989 | Johnson | 310/12 |
| 5,174,215 A | 12/1992 | Barrows | 104/288 |
| 5,208,496 A | 5/1993 | Tozoni et al. | 310/12 |
| 5,251,741 A | 10/1993 | Morishita et al. | 198/690.1 |
| 5,263,419 A | 11/1993 | Moroto et al. | 104/290 |
| 5,317,976 A * | 6/1994 | Aruga et al. | 104/282 |
| 5,343,811 A | 9/1994 | Schuster | 104/283 |
| 5,402,021 A | 3/1995 | Johnson | 310/12 |
| 5,431,109 A | 7/1995 | Berdut | 104/283 |
| 5,452,663 A | 9/1995 | Berdut | 104/283 |
| 5,467,718 A | 11/1995 | Shibata et al. | 104/284 |
| 5,601,029 A | 2/1997 | Geraghty et al. | 104/284 |
| 5,606,210 A * | 2/1997 | Lin | 310/153 |
| 5,722,326 A | 3/1998 | Post | 104/281 |
| 6,005,317 A | 12/1999 | Lamb | 310/103 |
| 6,072,258 A | 6/2000 | Lamb | 310/191 |
| 6,101,952 A | 8/2000 | Thornton et al. | 104/282 |
| 6,129,193 A | 10/2000 | Link | 192/84.1 |
| 6,155,511 A | 12/2000 | Tadera et al. | 242/354 |
| 6,230,866 B1 | 5/2001 | Link | 192/84.1 |
| 6,242,832 B1 | 6/2001 | Lamb | 310/114 |
| 6,591,756 B2 * | 7/2003 | Mayer et al. | 104/290 |
| 6,832,449 B2 * | 12/2004 | Rennetaud et al. | 49/120 |

* cited by examiner

APPARATUS, SYSTEMS AND METHODS FOR LEVITATING AND MOVING OBJECTS

CROSS-REFERENCE TO RELATED APPLICATION

This application is a continuation-in-part of U.S. patent application Ser. No. 10/189,144, filed Jul. 2, 2002, now U.S. Pat. No. 6,899,036, which is continuation-in-part of Ser. No. 09/898,536 filed on Jul. 2, 2001, now U.S. Pat. No. 6,510,799, issued Jan. 28, 2003, and of U.S. provisional application No. 60/375,220, filed Apr. 23, 2002.

BACKGROUND OF THE INVENTION

1. Field of Invention

The invention relates to apparatus, systems and methods for moving objects. More particularly, the invention relates to levitating, accelerating and decelerating objects with reduced friction and increased efficiency.

2. Description of the Related Art

Magnetically levitated trains, conveyor systems and related means of transportation have been attempted many times in the past few decades in an effort to provide more efficient means of transportation for individuals and cargo. A few examples of such systems can be seen in U.S. Pat. No. 4,356,772 to van der Heide; U.S. Pat. No. 4,805,761 to Totsch; and U.S. Pat. No. 5,601,029 to Geraghty et al. These systems operate on the general property that magnets having like polarities repel each other, and magnets having opposite polarities attract each other. Notwithstanding the fact that patent applications have been filed for such systems for decades, a system for moving people and cargo that is viable under real world conditions has yet to be developed.

SUMMARY OF THE INVENTION

The present invention is directed towards apparatus, systems and methods for levitating and accelerating objects. In particular, embodiments of the present invention allow objects to be magnetically levitated and magnetically accelerated with respect to rails, such as train tracks and the like.

In one embodiment, the system incorporates a number of lower rails spaced laterally apart from each other, and an object having a number of upper rails aligned with the lower rails. The lower rails have permanent magnets abutted one against the next and aligned such that the upper surface of the lower rail has a uniform polarity along its length. The lower rails also has a ferrous backing plate that electroconductively couples the permanent magnets along the length of the track. The upper rails have a number of permanent magnets aligned to oppose the magnets in the lower rails to levitate the object. The upper rails also have a ferrous backing plate electroconductively coupling the permanent magnets.

Another embodiment of the invention comprises a number of first rails, an object to be transferred, a third rail, and a driving disc. The first rails each have a number of permanent magnets aligned near its upper surface. The permanent magnets are oriented to create a uniform polarity along a length of each of the first rails. The object being transported has second rails that are configured to align with the first rails during operation. The second rails have permanent magnets mounted thereon that are oriented to oppose the polarity of the magnets in the first rails. Consequently, the object levitates above the first rails. The third rail extends along the length of the first rails. The third rail is made from an electroconductive material, such as copper or aluminum. The disc is connected to the object being transported, and rotates with respect to the object. The disc carries a number of permanent magnets. The disc is positioned such that the permanent magnets are in close proximity to the third rail during operation. Rotation of the disc, and more importantly movement of the permanent magnets, in the proximity of the third rail results in eddy currents that accelerate the object along the third rail in a direction opposite the relative rotation of the disc.

Yet another embodiment of the present invention incorporates rails and an object similar to that described above, but wherein the drive system incorporates several third rails, and one or more corresponding discs, to increase the efficiency of the drive system. The disc or discs can be sandwiched between parallel third rails, effectively doubling the force of acceleration/deceleration generated by each disc.

Still another embodiment of the present invention incorporates one or more magnetic rails, such as one of those discussed above. In this embodiment, however, the particular object levitating above the rail is the mounting section of a door or window, such as a large hangar door or the like. The mounting section of the door or window has a number of opposing upper magnets configured to align with the rail or rails. As provided above, the upper magnets need not be in contact with each other, but can instead be spaced apart along the length of the door or window.

DETAILED DESCRIPTION OF THE ILLUSTRATED EMBODIMENTS

The present detailed description is generally directed toward systems, apparatus and methods for levitating a cart or other object above a track, and for accelerating the object with respect to the track. Several embodiments of the present invention may allow an individual to levitate an object above a track, and to accelerate and decelerate the object, all without contacting the track. Accordingly, such embodiments can provide highly efficient transportation means for individuals or cargo. The inventors use a train car and a door or window as embodiments for illustrative purposes, but fully appreciate that the systems and devices of the present invention cold work with launchers for boats, rockets or spacecraft; conveyor systems for raw materials, products or other items; or any number of things.

Many specific details of certain embodiments of the invention are set forth in the following description and in FIGS. 1–25 to provide a thorough understanding of such embodiments. One skilled in the art, however, will understand that the present invention may have additional embodiments or may be practiced without several of the details described in the following description.

Figure 1:
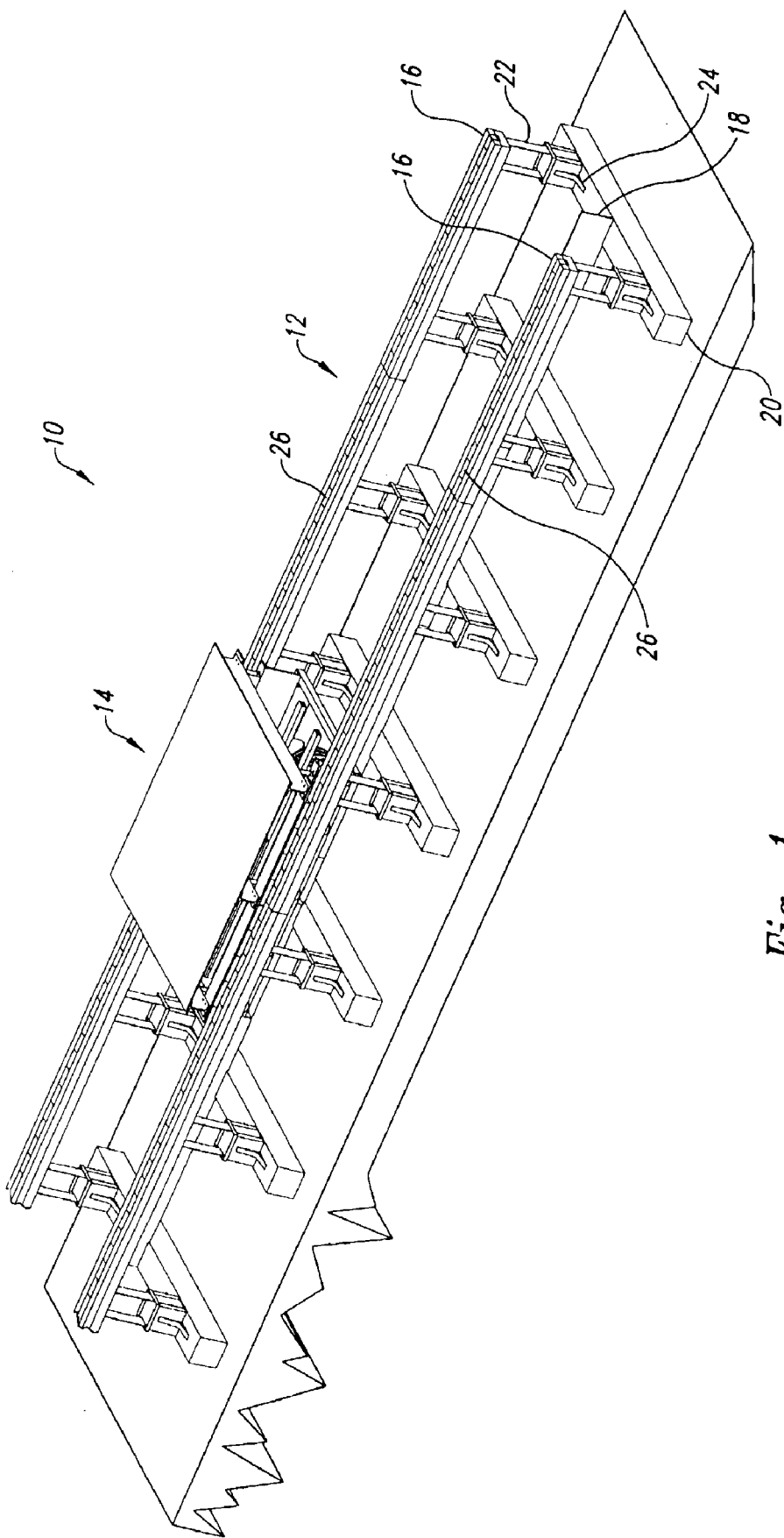
FIG. 1 is an isometric view of a track and a cart levitating above the track according to one embodiment of the present invention.

FIG. 1 illustrates a system 10 for levitating and accelerating objects. The system 10 incorporates a track 12 and a cart 14 configured to move longitudinally in either direction with respect to the track. The track 12 incorporates a pair of supporting rails 16 and a driving rail 18.

In the illustrated embodiment, the supporting rails 16 and the driving rail 18 are supported by a number of footings 20 spaced apart from each other along a length of track 12. The footings 20 are anchored to the ground as generally understood in the art. The driving rail 18 in the illustrated embodiment is mounted directly to the footings 20, such as by a flange formed at the lower edge of the driving rail. The illustrated driving rail 18 is centrally located along the length of each of the footings 20. Depending on the particular design of the cart 14, however, it is envisioned that the driving rail 18 can be positioned at other locations inside, outside, above and below the supporting rails 16, as would be appreciated by one of ordinary skill in the relevant art.

In the illustrated embodiment, the supporting rails 16 are coupled to the footings 20 by a number of posts 22 and brackets 24, and extend along opposing ends of the footings. As with the driving rail 18, however, different configurations are possible, as one of ordinary skill in the art would appreciate.

The upper surface of each of the supporting rails 16 carries a number of permanent magnets 26 extending along an operable portion of its length. In the illustrated embodiment, the permanent magnets 26 in the support rails 16 are all of a common length. The illustrated permanent magnets 26 are butted against each other along the length of the track 12 to provide a magnetic force that is sufficiently constant to enable the cart 14 to move smoothly along the track. The permanent magnets 26 are oriented such that every magnet along the respective supporting rail 16 has its polarity vertically aligned with the adjacent permanent magnets. The inventor appreciates that it is not necessary that every permanent magnet 26 be aligned in order for the invention to operate. The illustrated embodiment, however, is provided as an example of one preferred embodiment.

Figure 2:
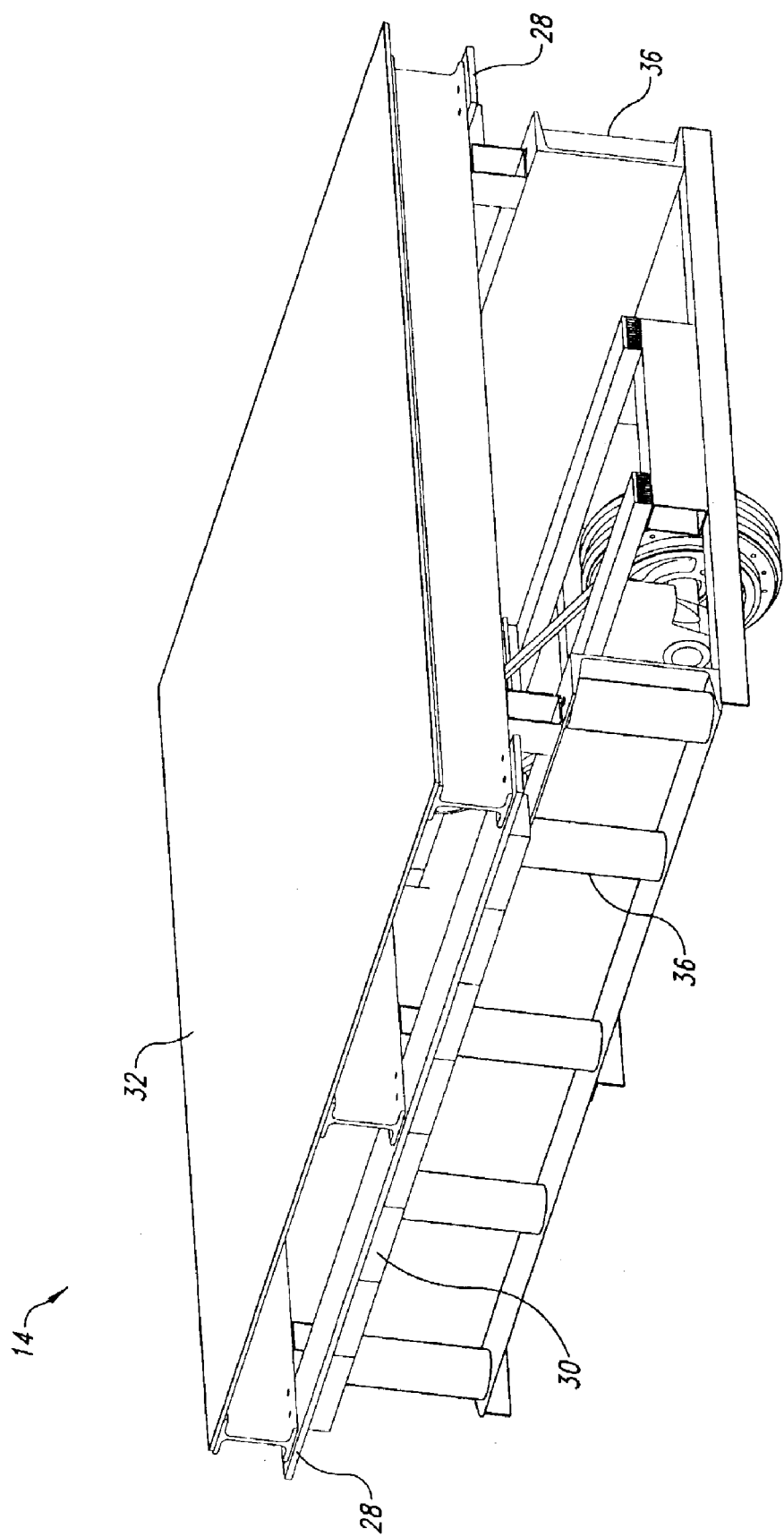
FIG. 2 is an isometric view of the cart of FIG. 1.
Figure 3:
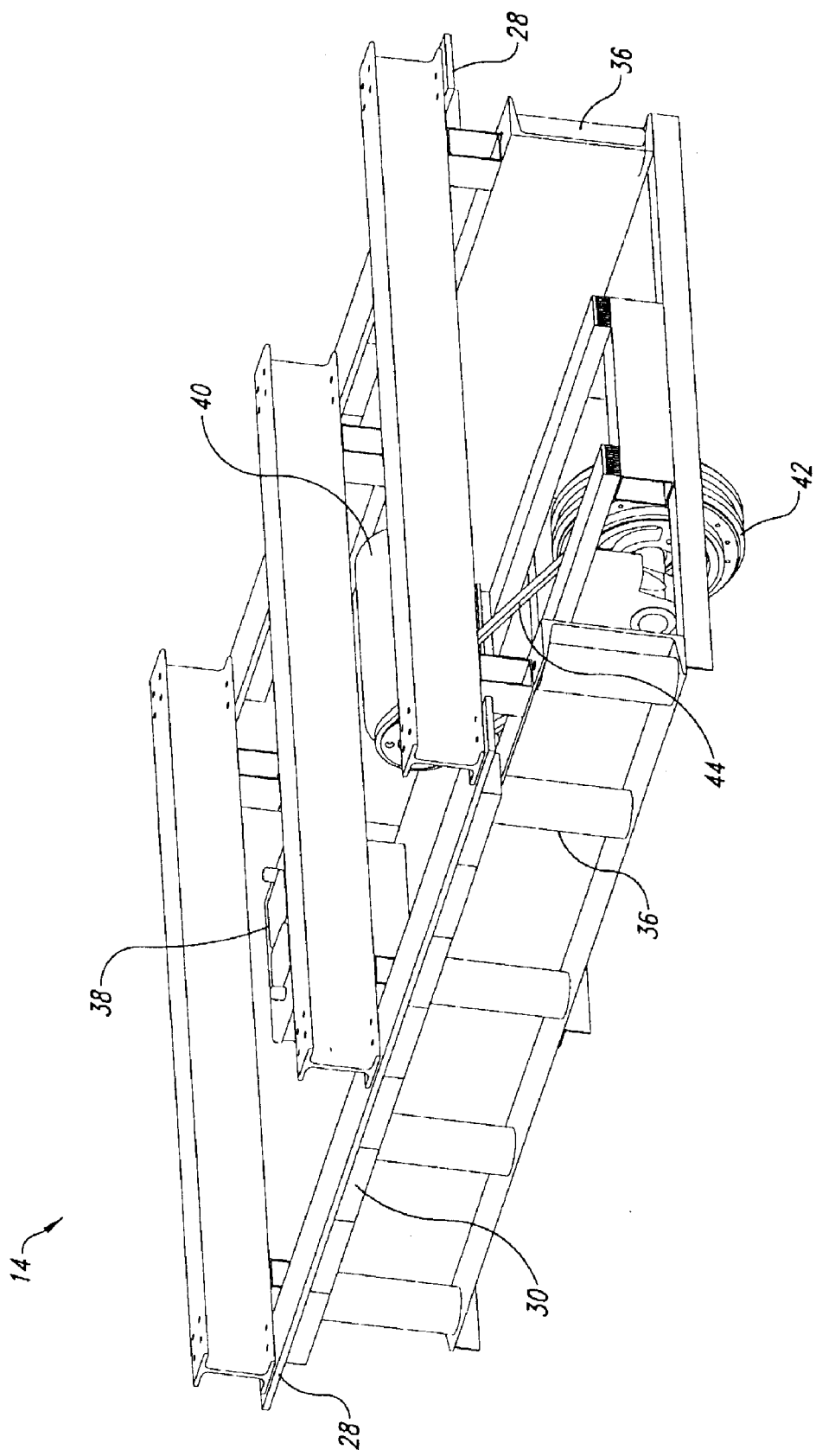
FIG. 3 is an isometric view of the cart of FIG. 2 with a platform removed therefrom.

FIGS. 2 and 3 best illustrate the cart 14 according to this particular embodiment of the present invention. The cart 14 incorporates a pair of opposing side rails 28 spaced apart to generally align with the supporting rails 16 on the track 12. In the illustrated embodiment, the side rails are made from a ferrous material such as steel. Other materials of like qualities can be substituted for steel.

Attached to the underside of each of the side rails 28 is another set of permanent magnets 30 that align with the permanent magnets 26 on the supporting rails 16 when the cart 14 is engaged with the track 12. In the illustrated embodiment, the permanent magnets 30 in the side rails 28 are all of a common length. The length of each permanent magnet 26 in the supporting rail 16 is different, in this case longer, than the length of the permanent magnet 30 in the side rail 28. One of ordinary skill in the art, after reviewing this disclosure, will immediately appreciate that the difference in length prevents two adjacent seams in the support rail permanent magnets 26 from simultaneously aligning with two adjacent seams in the side rail permanent magnets 30, thus avoiding magnetic cogging. The permanent magnets 30 on the cart 14 are oriented with their polarities opposite to those of the permanent magnets 26 of the supporting rails 16. As a result, the cart 14 levitates above the track 12. In the illustrated embodiment, the permanent magnet 30 attached to the side rails 28 are abutted one against the next. The inventor appreciates, however, that these permanent magnets need not be in contact with each other for the cart 14 to have a smooth ride over the track 12.

The cart 14 has a platform 32 (FIG. 2) for carrying individuals or objects. The present invention can be configured for carrying cargo or people and, as a result, the platform 32 can have a wide variety of configurations. For example, platform 32 can be in the shape of a train car or a cargo container. Likewise, the platform 32 and the cart 14 can be sized for carrying only small objects.

The sides of the cart 14 have a number of rollers 36 spaced apart lengthwise along the cart. Rollers 36 are positioned to contact the supporting rails 16 should the cart move out of proper alignment with the track 12. The rollers 36 rotate about vertical axes, and consequently do not significantly affect the movement of the cart 14 along the track 12. It is envisioned by the inventor that a wide variety of means can be substituted for the rollers 36 to keep the cart 14 centered along the track 14.

As illustrated in FIG. 3, a battery 38, a motor 40 and a driving disc 42 are housed within this particular cart 14. The illustrated battery 38 is a 12-volt battery similar to one currently used in an automobile. The inventor appreciates, however, that a wide variety of power sources can be substituted for the battery 38, such as a fuel cell.

The motor 40 is coupled to the driving disc 42 by a belt 44. The inventor similarly appreciates, however, that the motor 40 and belt 44 can take other configurations, so long as the driving disc 42 can be controllably rotated to accelerate or decelerate the cart 14 with respect to the track 12. An onboard control system 45 (FIG. 6) is incorporated to allow a user to controllably accelerate and decelerate the rotation of the driving disc 42 to control the velocity and acceleration of the cart 14.

Figure 4:
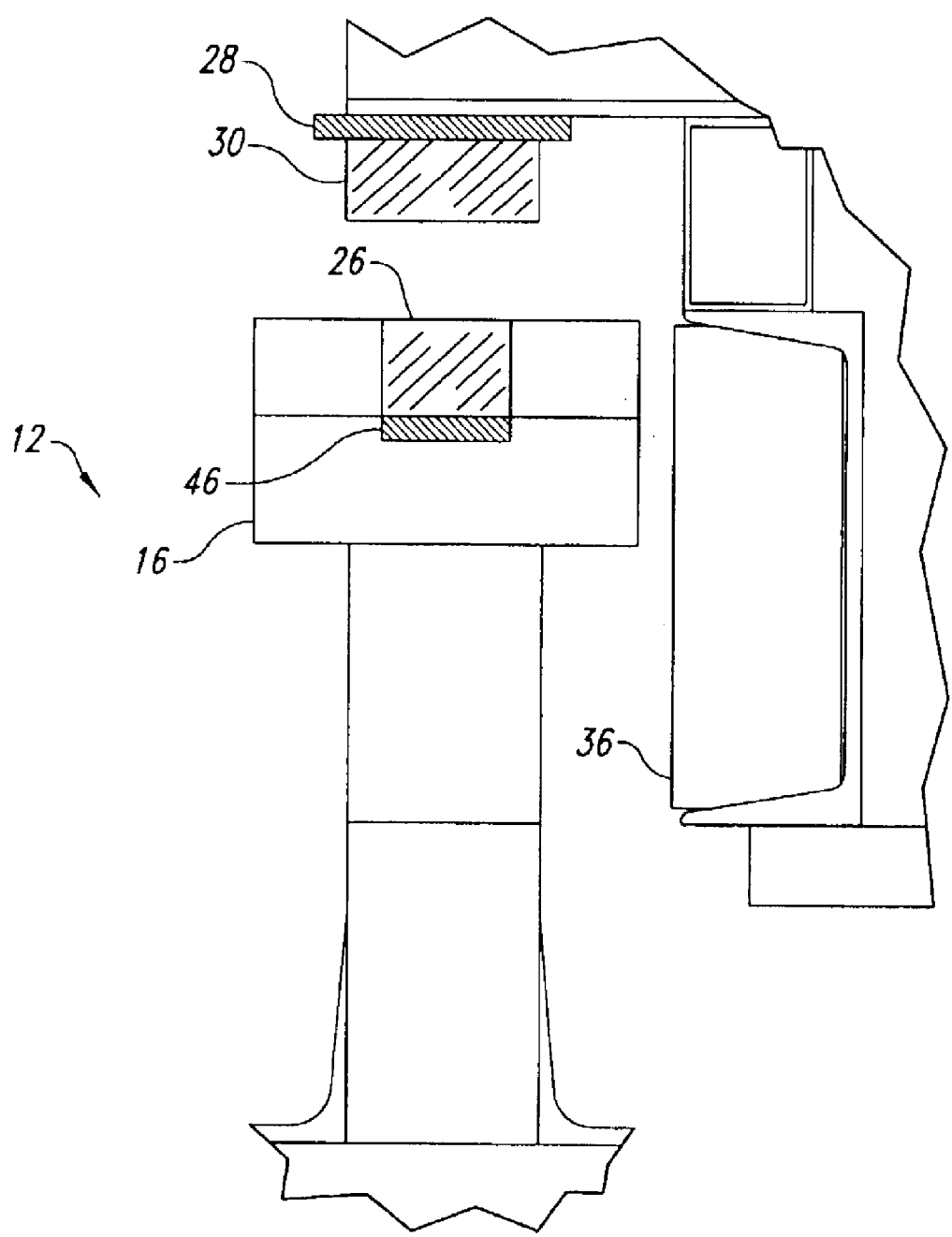
FIG. 4 is an end view of a portion of the track and cart of FIG. 1.

FIG. 4 illustrates the relative orientation of the permanent magnets 30 on the side rails 28 of the cart 14 when engaged with the track 12. As discussed above, the polarity of the permanent magnets 30 is opposite the polarity of the permanent magnets 26. In addition, in this particular embodiment, the lateral dimension of the permanent magnets 30 is greater than the lateral dimension of the permanent magnets 26. The inventor appreciates that these permanent magnets 26, 30 can have the same dimensions, or the permanent magnets 26 could be larger than the permanent magnets 30. One of ordinary skill in the art will appreciate, however, that when the magnets are of the same width, as seen in the prior art, additional lateral support and/or controls are necessary to maintain optimal lateral stability between the magnets. On the contrary, in the illustrated embodiment, the magnetic footprint of the upper magnets 30 is wider than that of the lower magnet 26, naturally providing additional lateral stability.

A ferrous backing material 46 is positioned under the permanent magnets 26 in the supporting rail 16. As with the side rails 28, the ferrous backing material 46 can be steel or an equivalent materials. The backing 46 extends along the length of the side rail 16.

Figure 5:
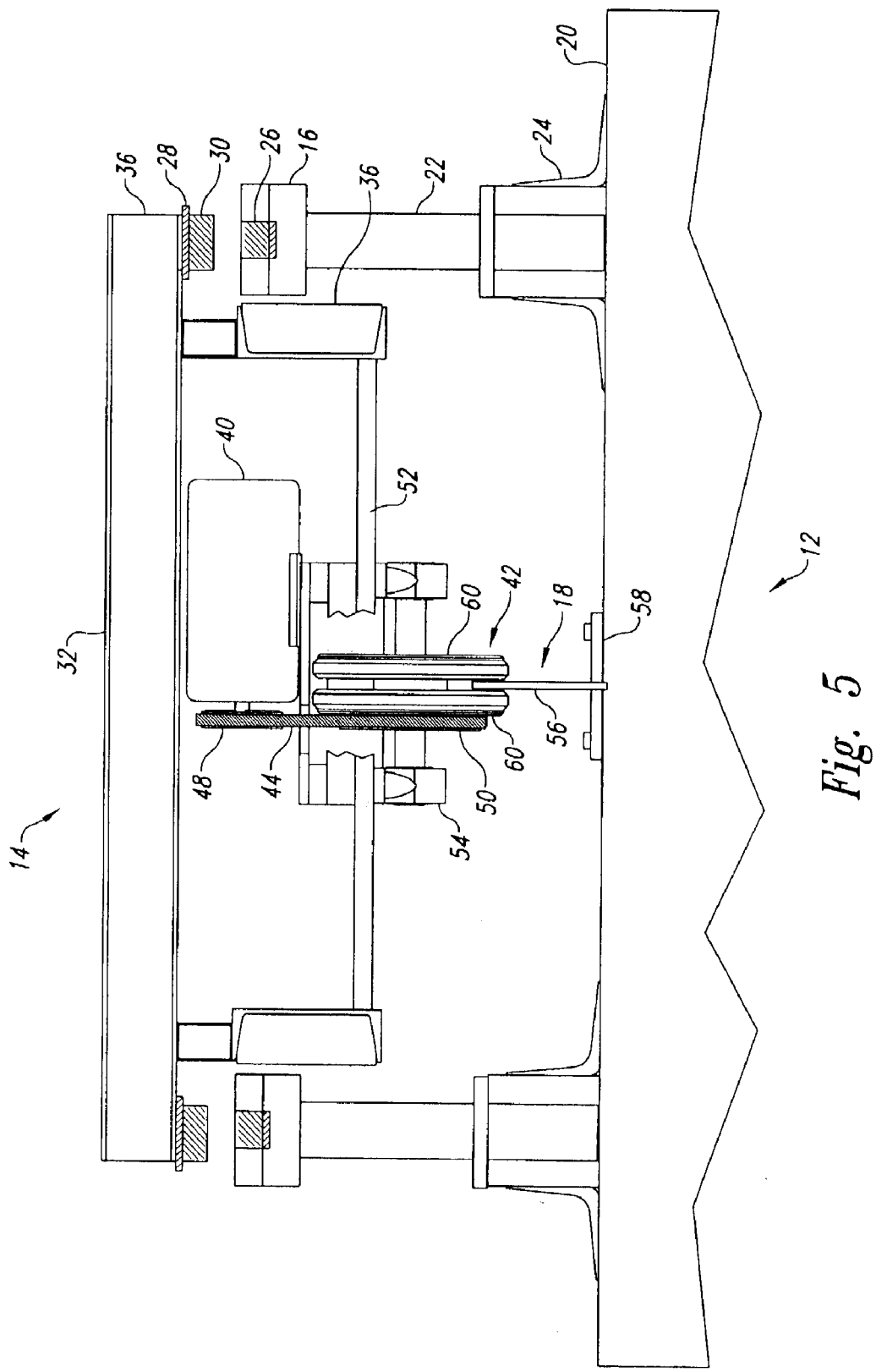
FIG. 5 is an end view of the track and cart of FIG. 1.
Figure 6:
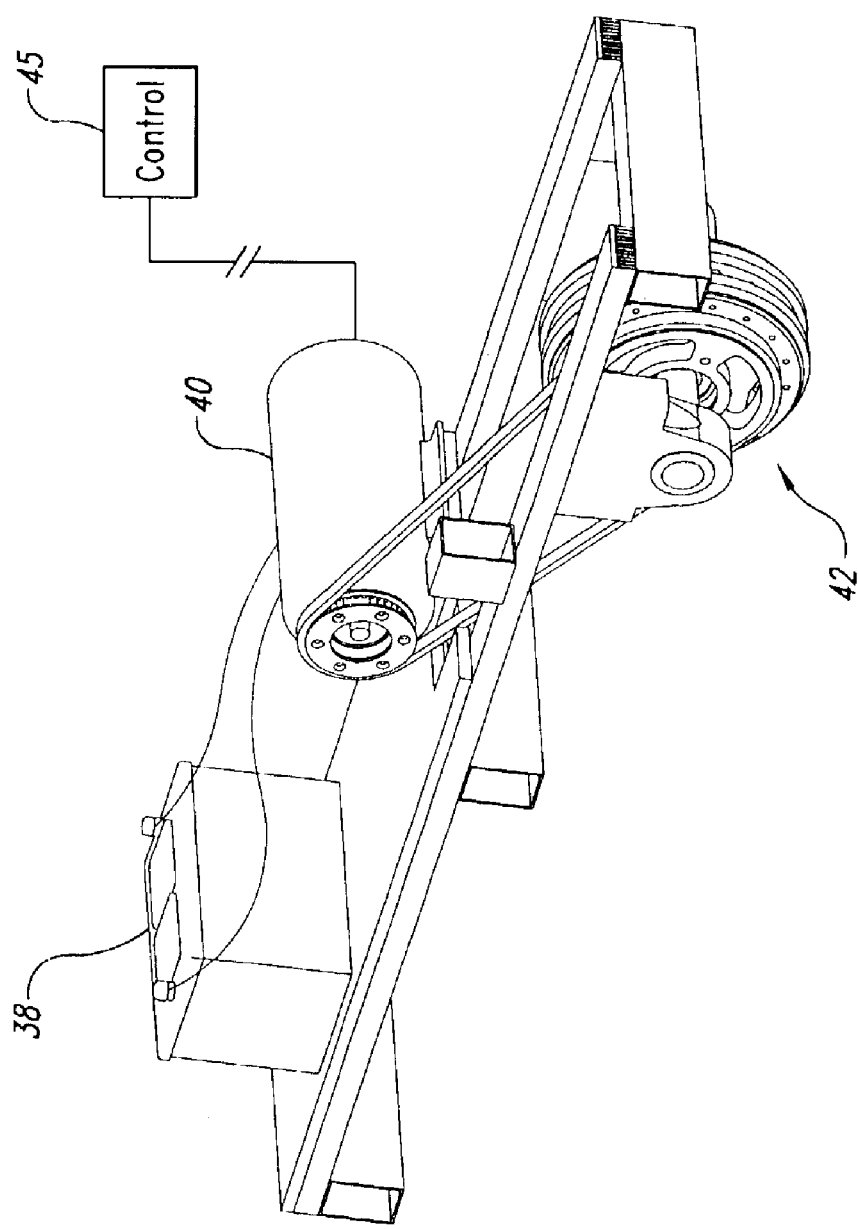
FIG. 6 is an isometric view of a drive assembly of the cart of FIG. 1.

As best illustrated in FIG. 5, a driving pulley 48 on the motor 40 operates the belt 44 to rotate a driven pulley 50 attached to the driving disc 42. The motor 40 is mounted on a cross-member 52, which is in turn mounted to the cart 14. Similarly, the driving disc 42 is mounted to an underside of the cross-member 52. The driving disc 42 is rotatably mounted on a pair bearings 54 to rotate with respect to the cart 14.

Figure 7:
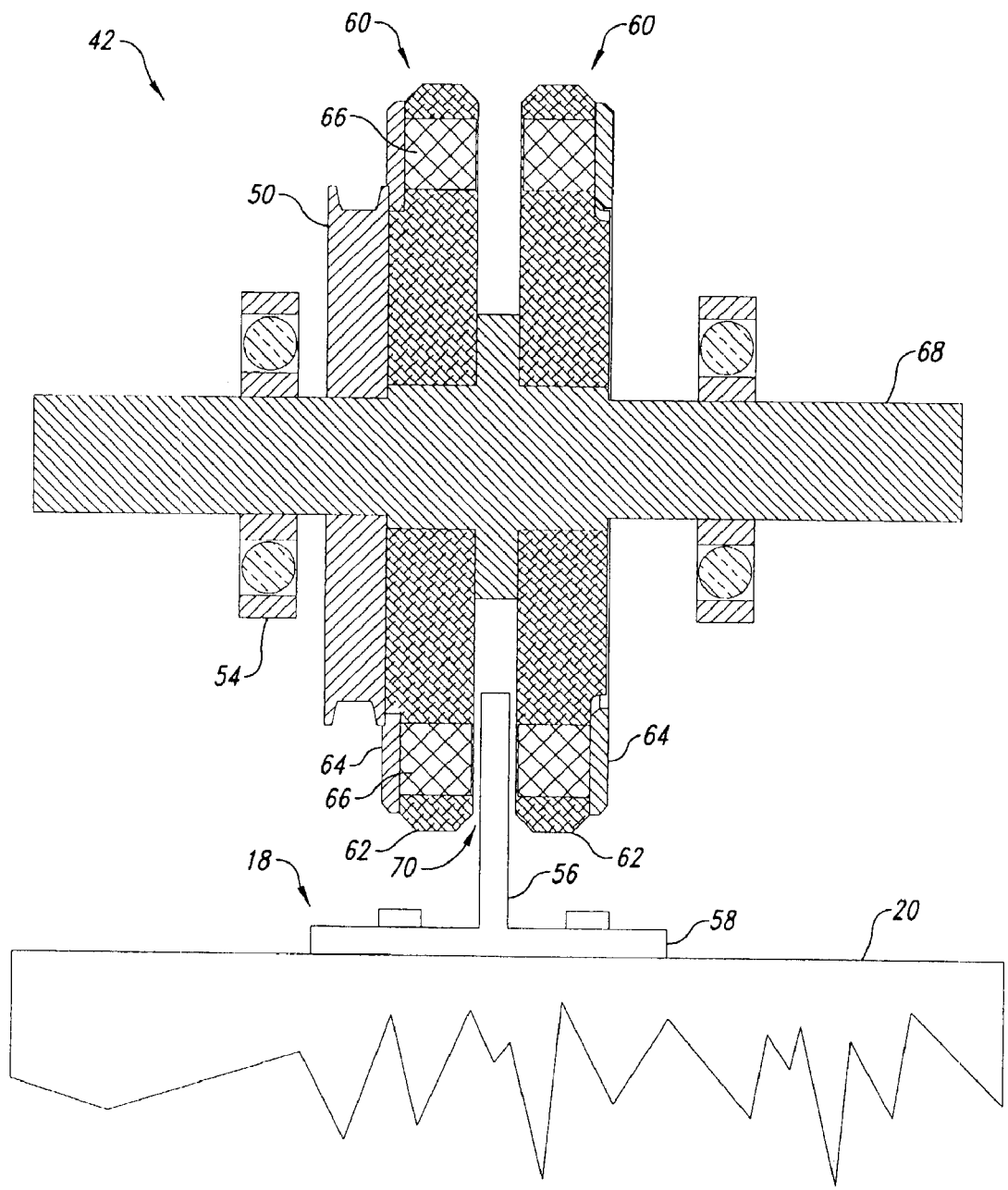
FIG. 7 is a sectional elevation view of a disc from the drive assembly of FIG. 6 engaged with a third rail of the track of FIG. 1, shown along a diametric section.
Figure 8:
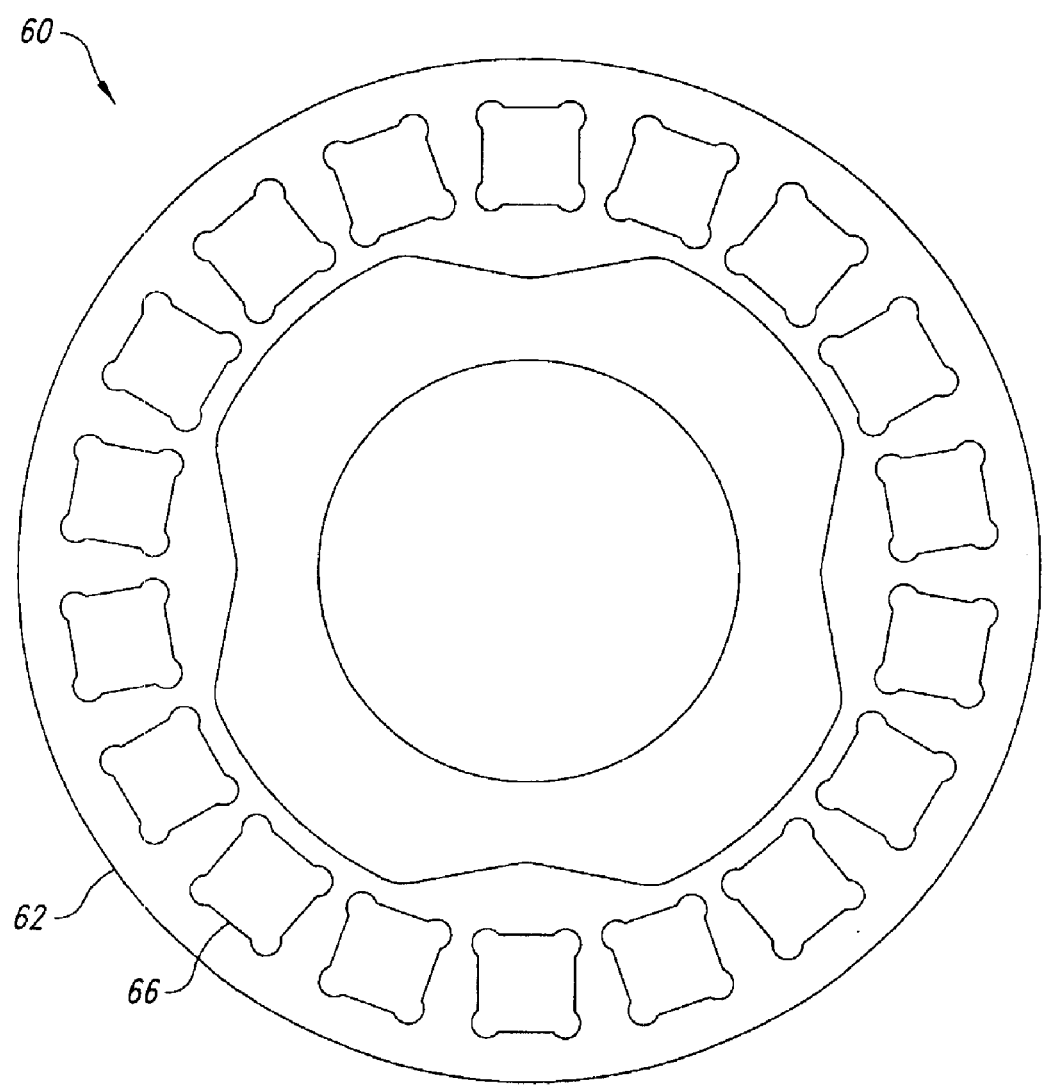
FIG. 8 is a side view of one of the discs of FIG. 7.

As illustrated in FIG. 7, the third rail 18 has a neck 56 and a flange 58. The flange 58 is mounted to the footing 20 to retain the third rail 18 in a fixed alignment with respect to the track 12. The neck 56 is in the form of a flat plate extending the length of the track 12. The driving disc 42 in the illustrated embodiment has a pair of magnet rotors 60, spaced one on each side of the neck 56 of the third rail 18. Each of the magnet rotors 60 has a non-ferrous mounting disc 62 backed by a ferrous backing disc 64, preferably of mild steel. The mounting discs 62 may be aluminum or a suitable non-magnetic composite, and each is fabricated with a number of permanent magnets 66 spaced apart from each other and arranged in a circle about a shaft 68 carrying the driving disc 42. Each of the permanent magnets 66 abuts on the outside of the driving disc 42 against the respective backing disc 64. Adjacent permanent magnets 66 may have their polarities reversed. The permanent magnets 66 are each spaced by an air gap 70 from the neck 56.

The mounting discs 62 are mounted to the shaft 68 to rotate in unison with the shaft. Rotation of the driving disc 42 with respect to the neck 56 results in relative movement between the permanent magnets 66 and the neck in a direction generally tangential to the driving disc. This tangential direction aligns with the length of the track. As is generally known in the industry, relative movement between a permanent magnet and an electroconductive material results in an eddy current urging the electroconductive material to follow the permanent magnets. In the present case, however, because the electroconductive material in the neck 56 is fixed to the footing 20, the electroconductive material cannot follow the permanent magnets. Instead, an equal and opposite force is exerted on the cart which carries the permanent magnets 66. This opposing force accelerates the cart in a direction opposite to the movement of the permanent magnets 66. Accordingly, controlled rotation of the driving disc 42 with respect to the neck 56 can accelerate or decelerate the cart 14 with respect to the track 12.

It also understood in the industry that adjustable gap couplings can be used to increase and decrease the resultant forces between the permanent magnets 66 and the neck 56. The inventor incorporates herein by reference U.S. Pat. No. 6,005,317; U.S. Pat. No. 6,072,258; and U.S. Pat. No. 6,242,832 in their entireties to disclose various structures that can be used to adjust the spacing between the permanent magnets 66 and the neck 56. Further, the inventor appreciates that a single magnet rotor 62 can be used instead of a pair of magnet rotors.

Embodiments of the present invention have numerous advantages over conveyance systems of the prior art. For example, the aligned polarities in the tracks and the ferrous backing material combine to create a powerful and consistent magnetic force which allows substantial weight to be carried and allows for smooth movement as the weight is transported along the track. Similarly, ferrous backing material incorporated into the side rails of the cart provides like benefits.

In addition, the magnetic driving disc contained on the cart allows for closely controlled, efficient acceleration and deceleration. Because the driving disc does not contact the third rail, there is no wear between the two parts. Further, because the driving disc is contained on the cart, each cart can be independently controlled to accelerate and decelerate along the track.

Figure 9:
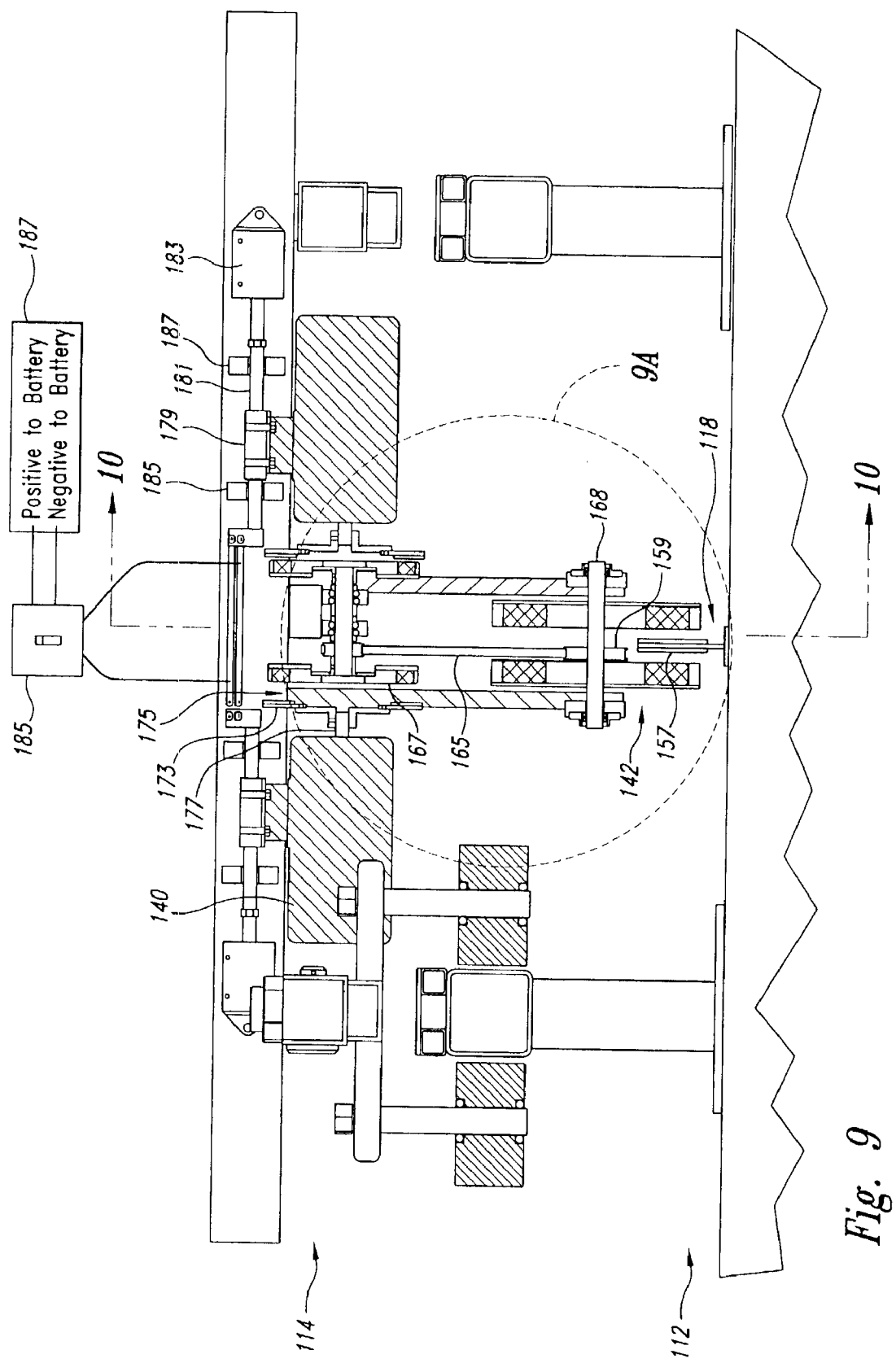
FIG. 9 is an end view of a track and a cart from an alternate embodiment of the present invention.
Figure 9A:
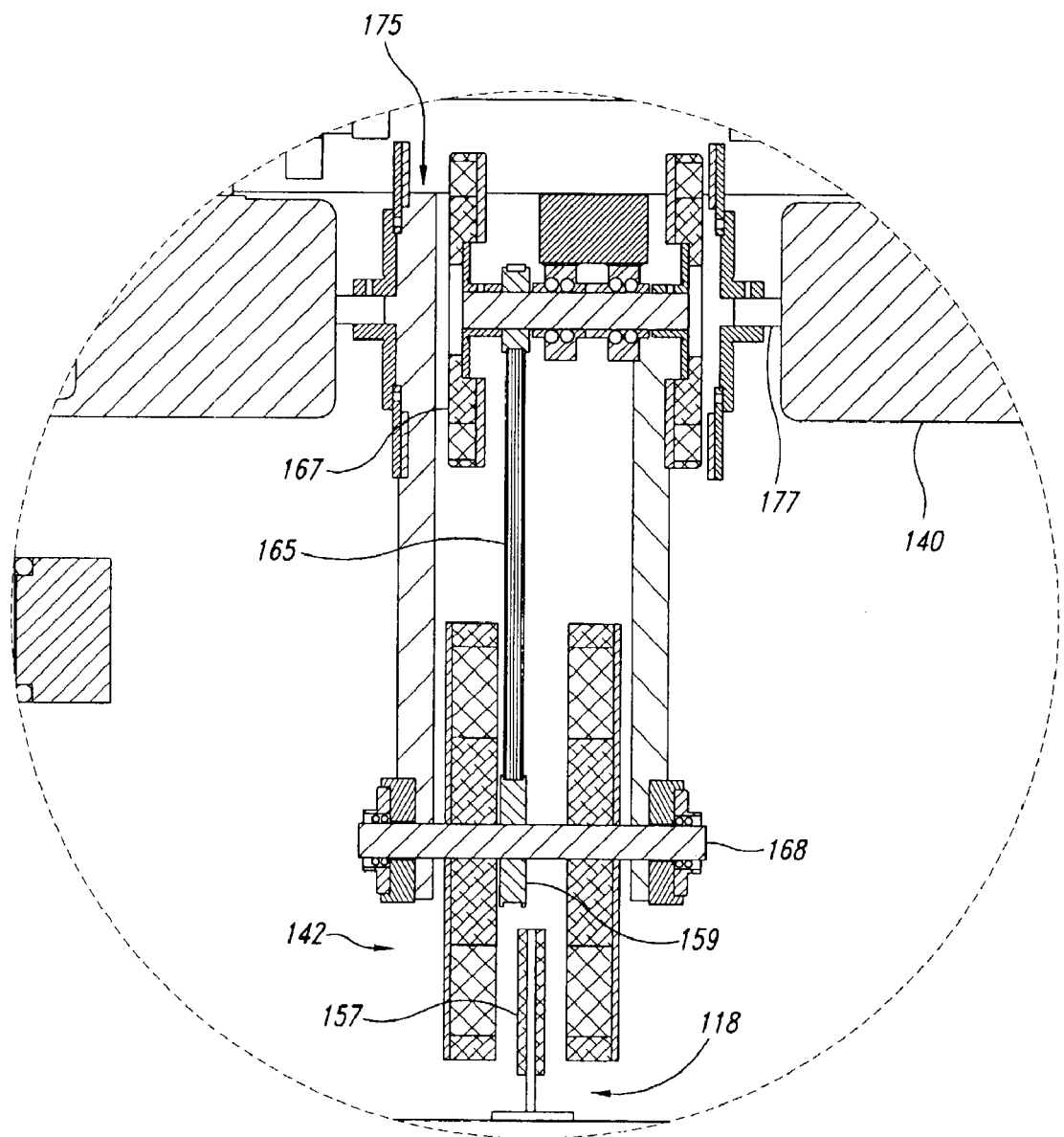
FIG. 9A is an enlarged view of a portion of the cart of FIG. 9.

FIGS. 9 and 9A illustrate a track 112 and a cart 114 according to another embodiment of the present invention. In general, the cart 114 and track 112 illustrated in FIG. 9 operate similar to that described above and illustrated in FIGS. 1–8. In particular, however, the guidance system and the drive system are both different than those described above. Accordingly, to the extent elements, features and advantages are not discussed below, they can be assumed to be similar to or identical to those described above.

In the illustrated embodiment, drive rail 118 incorporates a flange 158 and a neck 156, similar to those described above. In addition, a cover plate 157 is positioned over opposing sides of the neck 156 and extends along the length of the drive rail 118. In this particular embodiment, the neck 156 and flange 158 are manufactured from steel, while the cover plate 157 is manufactured from aluminum. The inventors appreciate, however, that the cover plate 157 can be made from any other conductive material, the neck 156 can be made from any other material, preferably a ferrous material such as steel, and the flange 158 can be made from any suitable material. In the illustrated embodiment, the aluminum in the cover plate 157 serves as a conductor for a set of lower magnet rotors 142, and the steel in the neck 156 serves as a ferrous backing plate for each of the opposing cover plates.

As with the above embodiment, the lower magnet rotors 142 are positioned on opposing sides of the drive rail 118, and are operable to accelerate and decelerate the cart 114 with respect to the track 112. In this particular embodiment, however, two pairs of opposing lower magnet rotors 142 are positioned one pair in front of the other along the drive rail 118 (best illustrated in FIG. 10). Each pair of lower magnet rotors 142 rotates about a lower shaft 168 to create relative movement between the lower magnet rotor 142 and the drive rail 118 and accelerate or decelerate the cart 114 with respect to the track 112.

Figure 10:
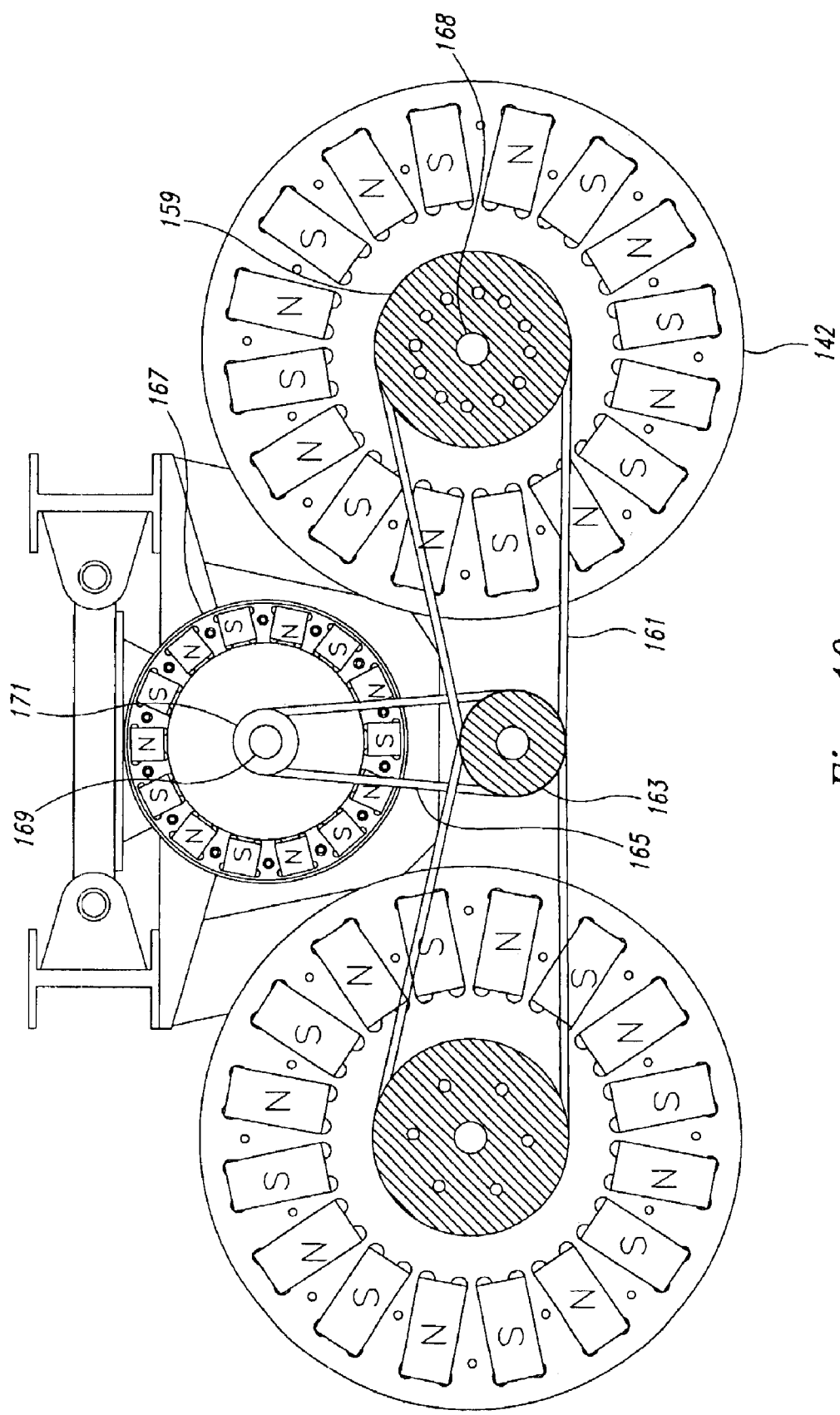
FIG. 10 is a cross-sectional view of the cart of FIG. 9, viewed along Section 10—10.

As seen in FIG. 10, each lower shaft 168 has a sheave 159 fixed thereto to rotate the lower magnet rotor 142 in response to movement of a horizontal belt 161. The horizontal belts 161 are driven by a central pulley 163, which is in turn driven by a vertical belt 165. Unlike the prior embodiment, where the belt is driven directly by the motor 40, the vertical belt 165 in the present embodiment is driven by a pair of upper magnets rotors 167. These upper magnet rotors 167 share an upper shaft 169 and an upper pulley 171, which drives the vertical belt 165.

Rotation of the upper magnet rotors 167 about the upper shaft 169 results in rotation of the upper pulley 171, which in turn drives the vertical belt 165, rotating the central pulley 163. Rotation of the central pulley 163 drives the opposing horizontal belts 161, each of which drives a sheave 159 on one of the pairs of lower shafts 168. Rotation of the lower shaft 168 results in rotation of both pairs of lower magnets rotors 142. As discussed above, rotation of the magnet rotors 142 with respect to the drive rail 118 results in acceleration or deceleration of the cart 114 with respect to the track 112.

The velocity and power of the magnet rotors 167 is adjusted through axial movement of an opposing pair of conductor rotors 173 positioned to face the upper magnet rotors 167 from opposing sides. The conductor rotors 173 and opposing upper magnet rotors 167 function similar to adjustable gap couplings known in the art. As such, the torque transferred from the conductor rotors 173 to the upper magnet rotors 167 is varied by changing the size of a gap 175 therebetween. In the embodiment illustrated in FIG. 9, the gap 175 in the coupling on the left end of the upper shaft 169 is greater than the gap on the right end of the upper shaft. The inventors appreciate that the two couplings cooperate to drive the upper shaft 169, and that the opposing couplings can be adjusted independently or in combination to increase or decrease the torque transferred from the conductor rotors 173 to the upper magnet rotors 167.

The gap 175 is adjusted by moving a motor 140 toward or away from the upper magnet rotor 167. The motor 140 has a drive shaft 177 projecting therefrom that is coupled to the conductor rotor 173. The motor 140 is mounted to the cart 114 at a sliding bushing 179, which moves laterally along an adjustment rod 181. The sliding bushing 179 can be moved back and forth along the adjustment rod 181 by a dual-acting air cylinder 183. The air cylinder 183 moves the sliding bushing 179 along the adjustment rod 181 between a pair of inner stops 185 and a pair of opposing outer stops 187. Because the conductor rotors 173 are mounted on the motors 140, axial movement of the motors results in axial movement of the conductor rotors and, as a result, adjustment of the gap 175.

The motors 140 are operated with an actuator, such as a switch 185 illustrated in FIG. 9. The illustrated switch 185 is coupled between a source of electricity, such as a battery 187, and the motors 140, and can be actuated to rotate the motors in either direction to accelerate or decelerate the cart 114 with respect to the track 112.

Figure 11A:
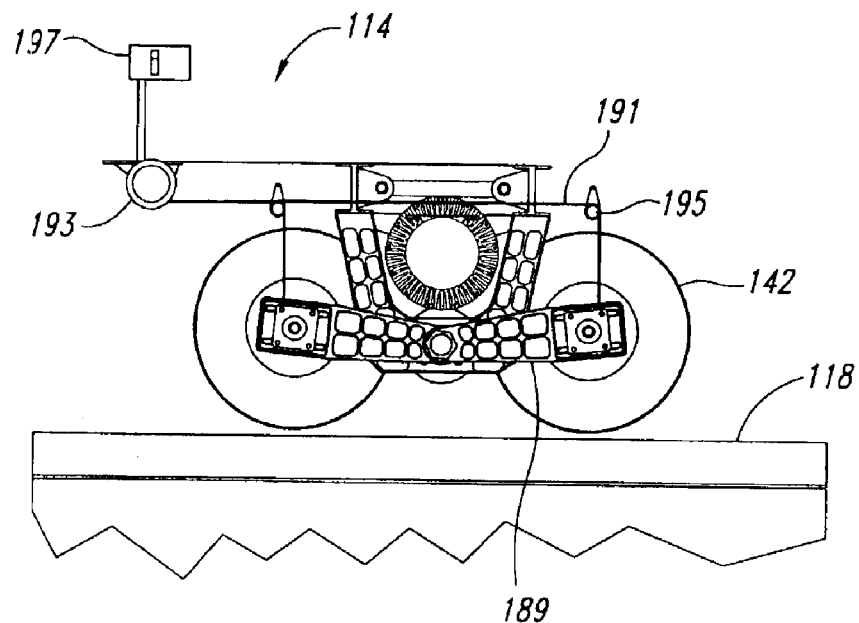
FIG. 11A is a schematic view of the portion of the cart of FIG. 10, shown in a disengaged configuration.
Figure 11B:
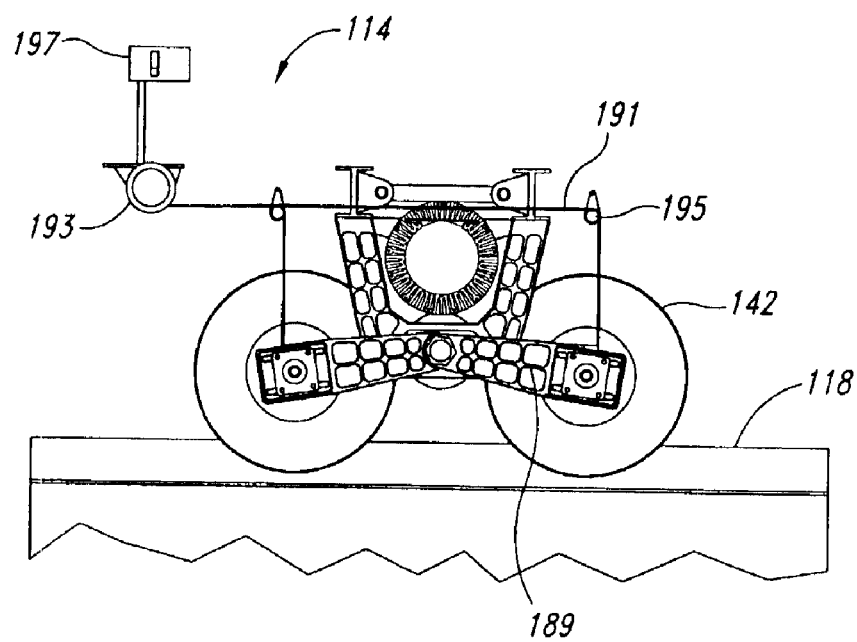
FIG. 11B is the portion of the cart of FIG. 11A, shown in an engaged configuration.

FIGS. 11A and 11B illustrate the lower magnet rotors 142 disengaged from the drive rail 118 and engaged with the drive rail, respectively. Each lower magnet rotor 142 is linked to the cart 114 by a swing arm 189 that is pivotally mounted to swing the magnet rotor around a substantially horizontal axis such that the magnet rotor moves vertically to engage with and disengage from the drive rail 118. A pair of cables 191 are routed from a winch 193 over pulleys 195, and are controlled by an actuator 197 to adjust the height of each of the lower magnet rotors 142.

The magnet rotors 142 can be raised or lowered to compensate for the weight of the payload on the cart 114. In particular, with a heavier payload, the cart 114 may ride lower on the track 112 and, to compensate, the magnet rotors 142 could be raised, or vice versa.

Figure 12:
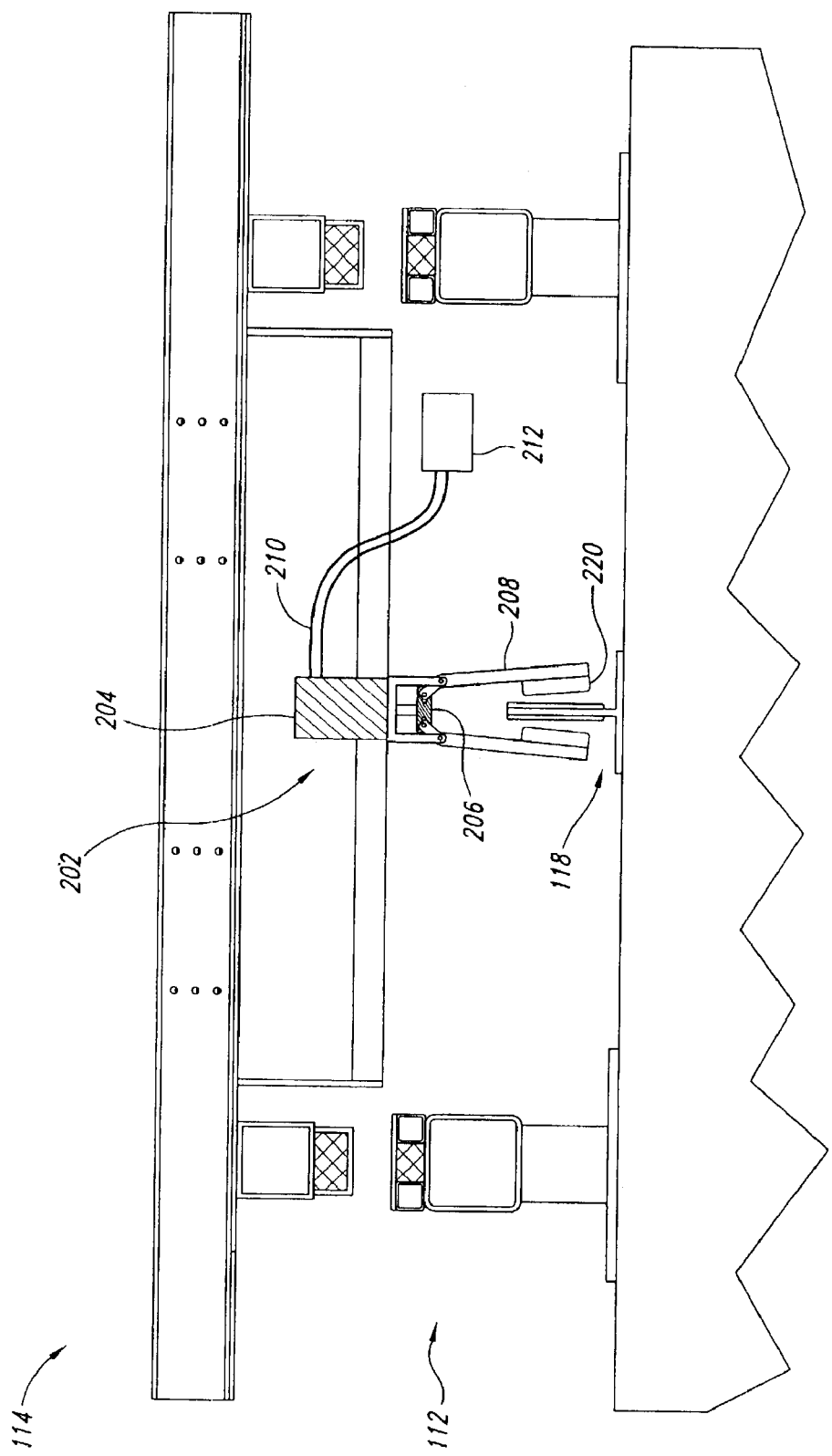
FIG. 12 is an end view of a portion of the track and cart of FIG. 9, illustrating a braking system in a disengaged configuration.
Figure 13:
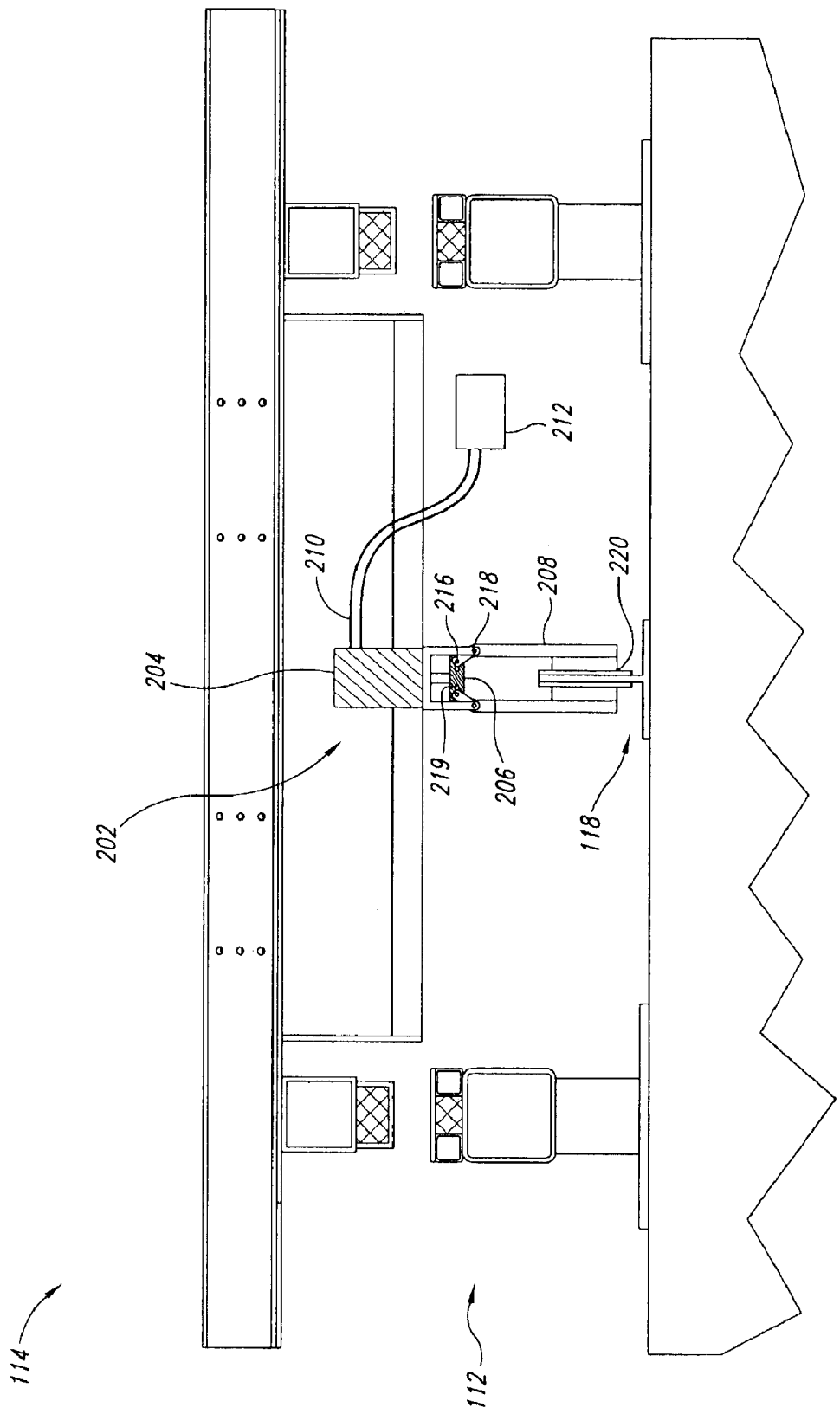
FIG. 13 is the portion of the track and cart of FIG. 12, shown with the braking system in an engaged configuration.

FIGS. 12 and 13 illustrated one particular braking assembly 202 according to an embodiment of the present invention. The braking assembly 202 is illustrated in the disengaged configuration in FIG. 12 and in the engaged configuration in FIG. 13.

The brake assembly 202 incorporates a pneumatic piston 204, an actuator 206 and a pair of opposing brake levers 208. The pneumatic piston 204 is connected by a pair of pneumatic lines 210 to a control unit 212. The control unit 212 directs pressurized air through the pneumatic lines 210 to or from the pneumatic piston 204 to pressurize an internal chamber therein (not shown) and to move a piston therein (not shown) axially with respect to the pneumatic piston. The actuator 206 is coupled to the internal piston to move with the internal piston as it is controlled by the control unit 212.

The brake levers 208 are coupled to the actuator 206 at a pair of elongated slots 214. When the actuator 206 moves downward, a pin 216 in the brake lever 208 slides inwardly along the slot 214. As the pin 216 moves inwardly along the slot 214, the brake lever 208 pivots around a pivot point 218 and the brake pads 220 rotate away from the drive rail 118. Likewise, when the actuator 206 moves upward as viewed in FIG. 13, the pins 216 move outward along the slots 214 and the brake levers 208 rotate around the pivot points 218 to compress the brakes against the drive rail 118. Because the brake assembly 202 is rigidly attached to the cart 114, when the brake pads 220 compress against the drive rail 118, the cart can be brought to rest with respect to the track 112.

Figure 14:
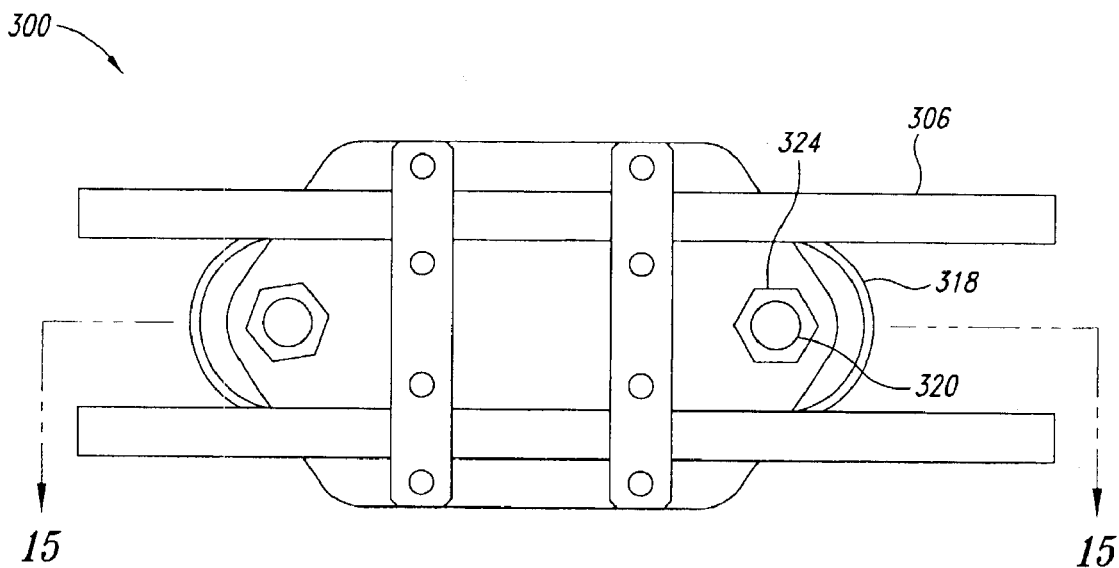
FIG. 14 is a plan view of a magnet assembly from the cart of FIG. 9.
Figure 15:
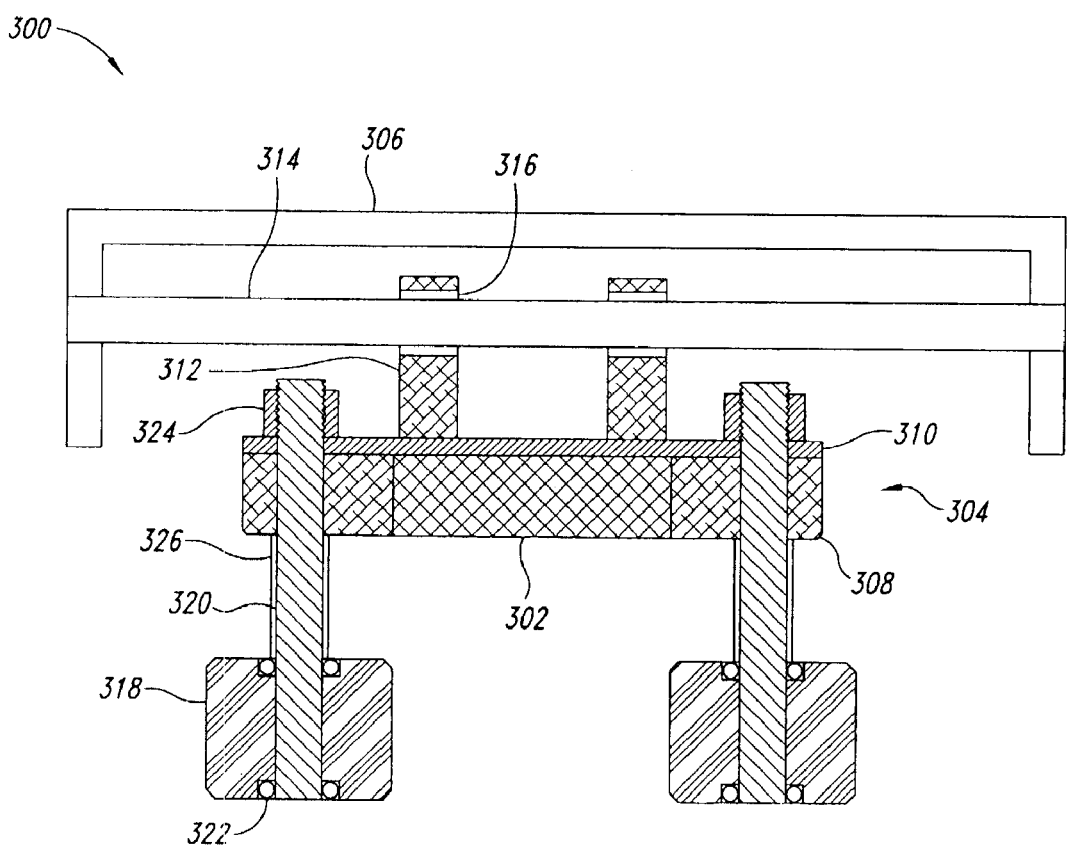
FIG. 15 is a cross-sectional view of the magnet assembly of FIG. 14, viewed along Section 15—15.
Figure 16:
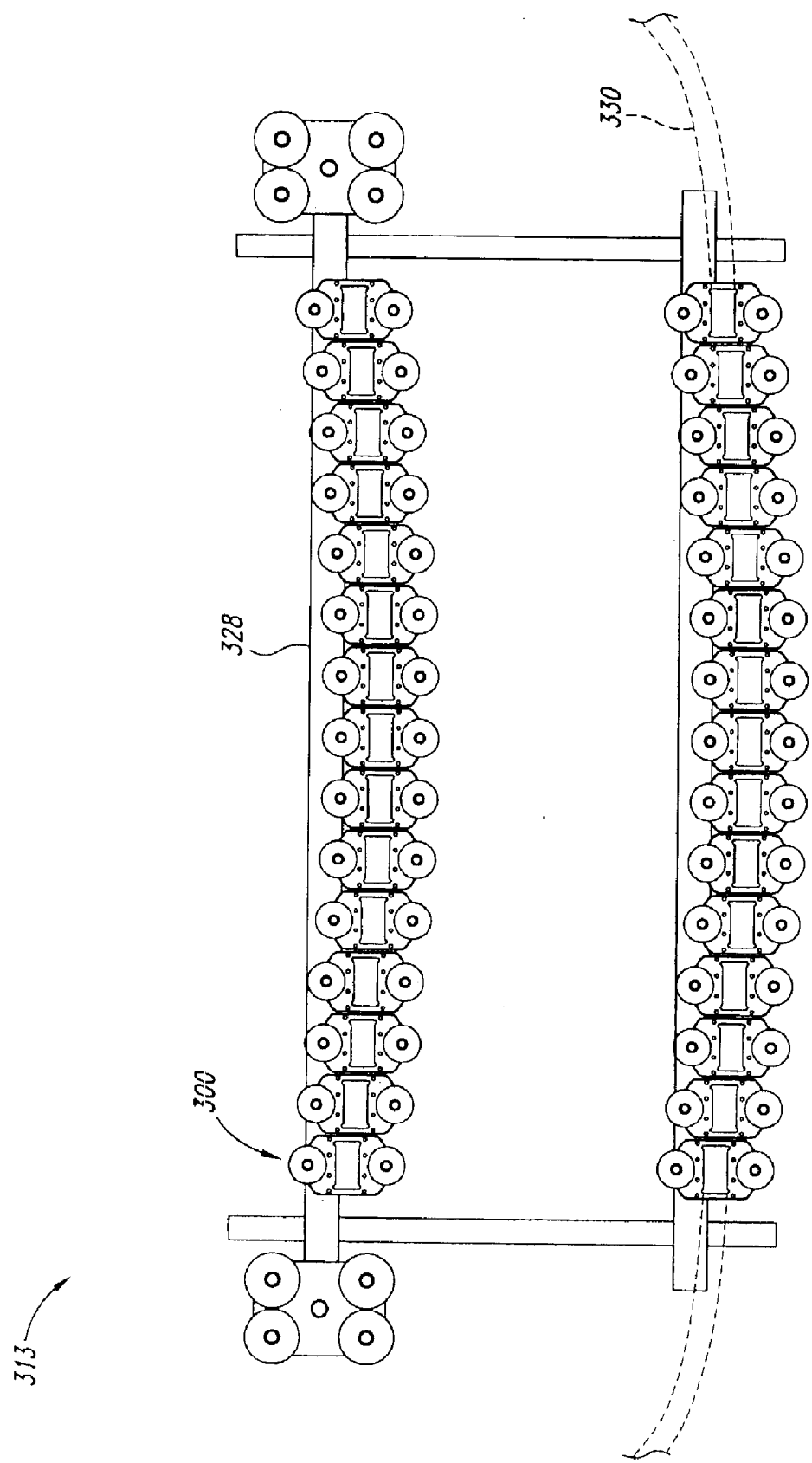
FIG. 16 is a plan view schematically illustrating a cart having magnets aligned for travel around a corner.

FIGS. 14 through 16 illustrate a magnet assembly 300 and a cart 314 configured with such a magnet assembly to facilitate maneuvering the cart around tight corners. As best illustrated in FIG. 15, the magnet assembly 300 incorporates a permanent magnet 302 housed within a sliding carriage 304 to move laterally within a bracket 306. The sliding carriage 304 incorporates a body 308 that receives the magnet 303 facing downward and which has a ferrous backing plate 310 positioned above the body 308. The permanent magnet 302 contacts the ferrous backing plate 310 to increase the effect of the forces exerted by the permanent magnets onto the opposing magnet in the track (not shown). A pair of arms 312 connects the sliding carriage 304 to a transverse shaft 314. A bushing 316 is configured to allow the sliding carriage 304 to move along the length of the transverse shaft 314. A pair of rollers 318 are coupled to the sliding carriage 304 by respective mounting rods 320. The rollers 318 are retained by compression bearings 322 to their respective mounting rods 320, which are in turn retained to the sliding carriage 304 by respective nuts 324. The compression bearings 322 allow the rollers 318 to rotate freely about the mounting rods 320. A sleeve 326 positioned between the body 308 and the roller 318 maintains a desired spacing between the body and roller.

As illustrated in FIG. 16, the magnet assemblies 300 are mounted by the bracket 306 to longitudinal structural members 328 on the cart 313. The transverse shafts 314 are oriented substantially perpendicular to the longitudinal structural members 328, such that the magnets assemblies 300 are free to move laterally with respect to the cart. The cart 313 illustrated in FIG. 16 is configured for moving around a corner. As such, the magnet assemblies 300 have moved laterally to conform to the curved shape of the track 330. Because each magnet assembly 300 is free to move independent of the other magnet assemblies, the rollers 318 move each magnet assembly as necessary to conform to the particular track shape. The magnet assemblies 300 can be biased, such as by springs or other means, to move into a configuration for driving along a straight length of track. Likewise, the magnet assemblies 300 can be configured for moving without any restriction.

Figure 17:
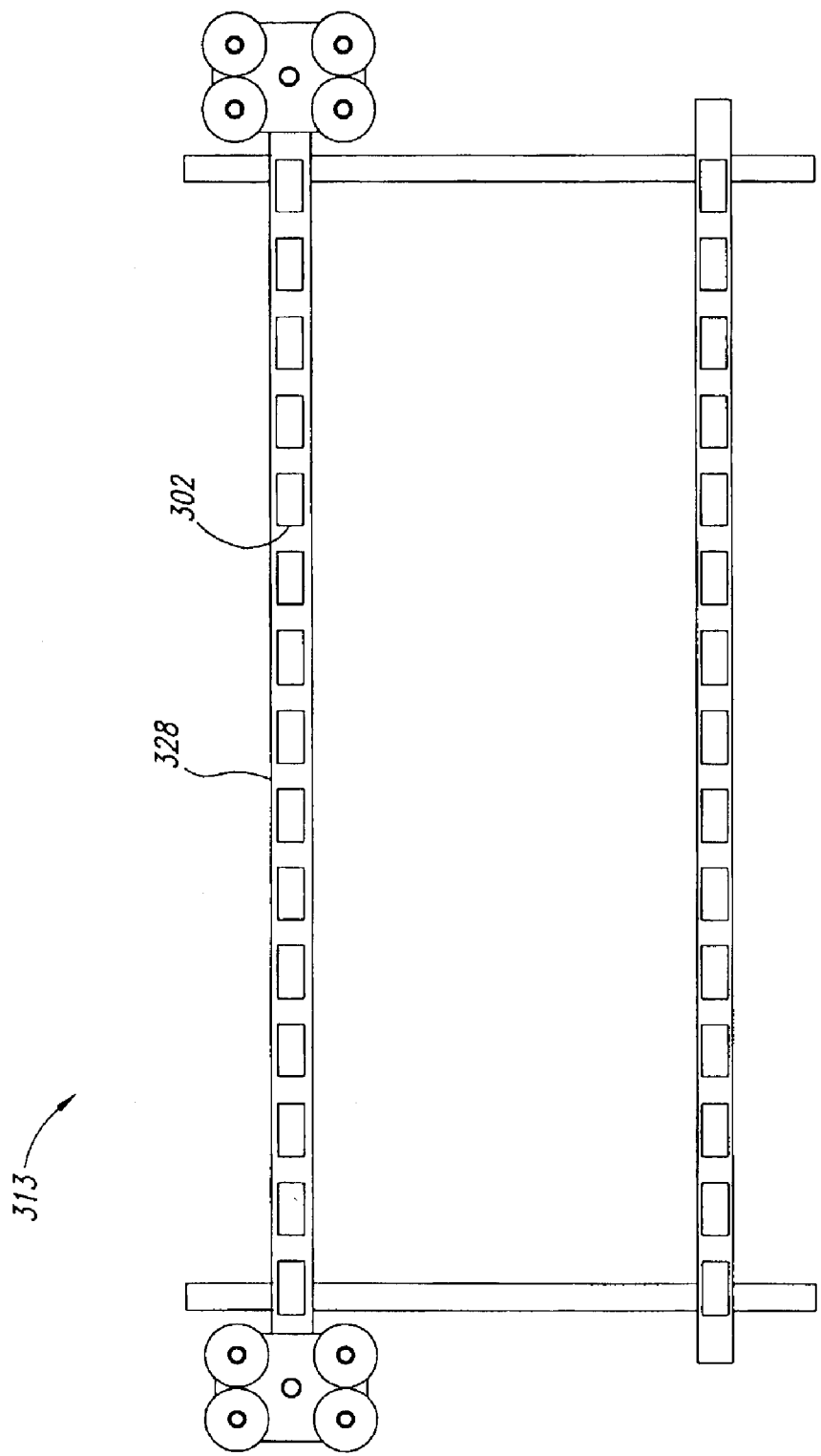
FIG. 17 is a plan view schematically illustrating a cart having magnets aligned for linear travel.

FIG. 17 schematically illustrates the cart 313 of this alternative embodiment configured for movement along a straight length of track. The magnets 302 are all aligned with the longitudinal structural members 328 to allow the cart 313 to move along the track in a desired alignment.

Figure 18:
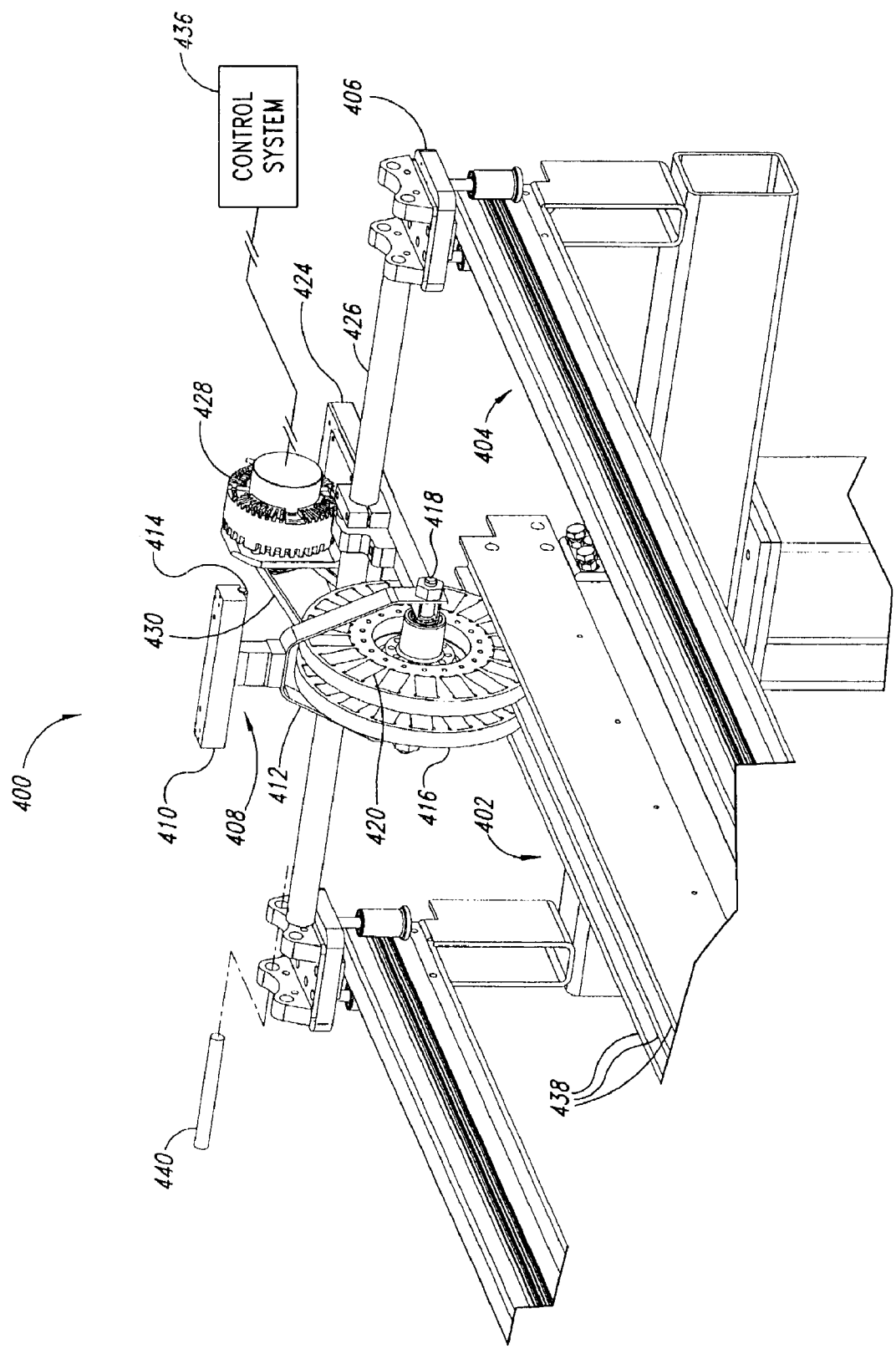
FIG. 18 is an enlarged isometric view of a section of track and a drive system from a cart, according to an alternate embodiment of the present invention.
Figure 19:
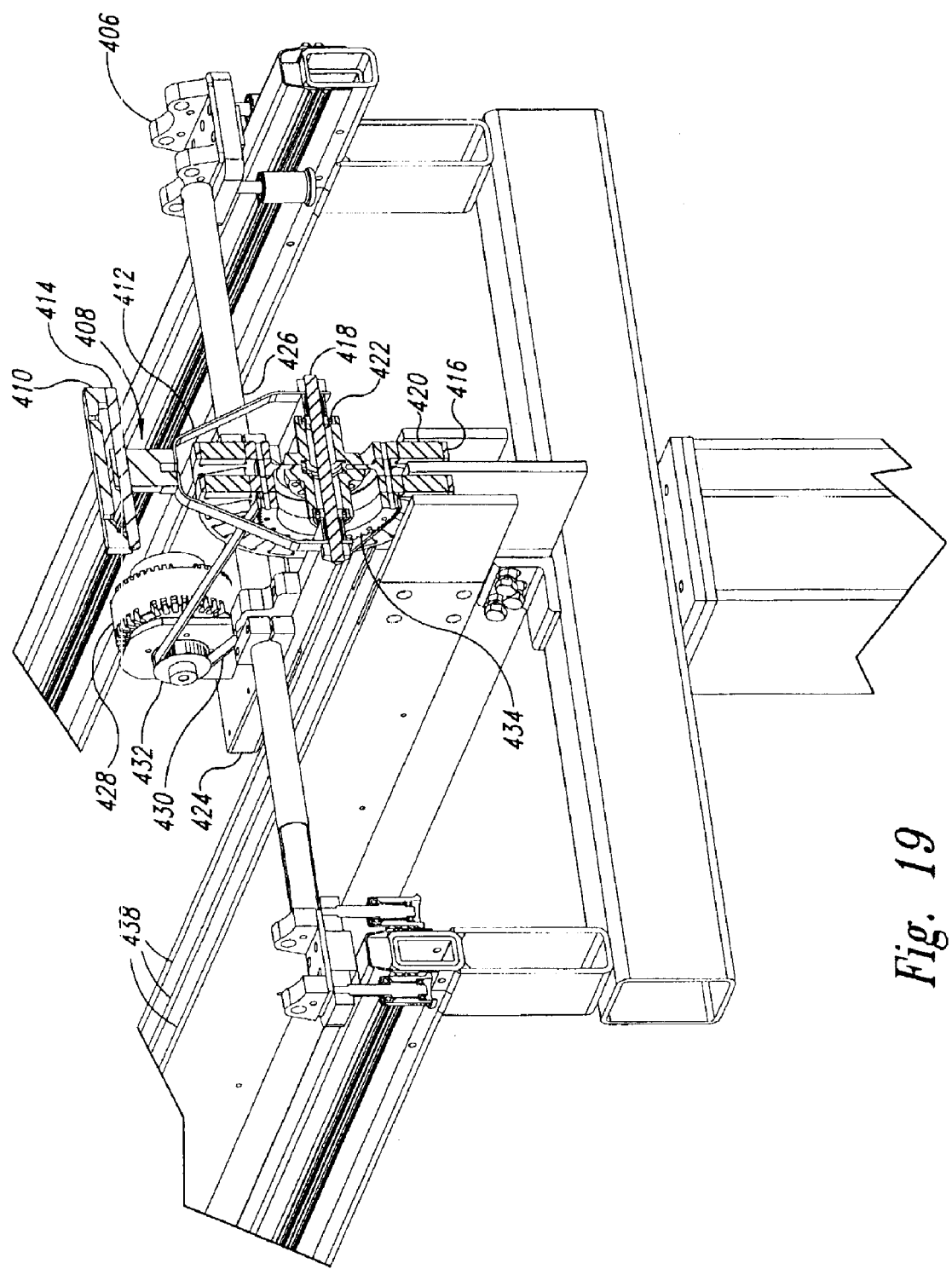
FIG. 19 is a rear isometric view of the section of track and the drive system of FIG. 18, in which a driving disc has been cut along a diametric cross-section.

FIGS. 18–21 illustrate cart and track systems according to yet another embodiment of the present invention. Portions of the systems that fall within the previous descriptions and/or are shown in the preceding drawings have been omitted for clarity and brevity. As generally illustrated in FIGS. 18 and 19, a cart according to this particular embodiment is configured with a drive system 400 designed to maintain proper alignment of the driving discs and the driving rails during cornering; a multi-rail drive rail system 402 for providing additional acceleration and deceleration; and an improved support rail system 404 for facilitating construction and maintenance.

The drive system 400 is mounted to a cart by a pair of opposing sliding carriages 406 and a sliding suspension bracket 408. As discussed in detail below, the elements of the drive system 400 are configured to move laterally as a unit with respect to the cart between these three couplings.

The sliding carriages 406 are described in detail above in connection with sliding carriages 300. Accordingly, the details surrounding sliding carriages 406 are not repeated here. The sliding suspension bracket 408 incorporates an upper fixed bracket 410 and a lower yoke assembly 412. The fixed bracket 410 is configured to be attached by fasteners or the like to a structural member on the cart. The lower yoke assembly 412 is slidably mounted to a lateral shaft 414 to move transverse with respect to the fixed bracket 410 and, in turn, the cart. Consequently, the entire drive system 400 is free to move transversely as a unit with respect to the cart, which as described below, allows the drive system to maintain a desired alignment with the drive rail system 402 regardless of the alignment and positioning of the cart on the track.

In the illustrated embodiment, a pair of magnet rotors 416 is suspended from the suspension bracket 408 by the yoke assembly 412. The opposing lower ends of the yoke assembly 412 are attached to opposing ends of a rotary shaft 418 for the magnet rotors 416. The magnet rotors 416 are coupled to the rotary shaft 418 by compression bearings 422 (FIG. 19) or the like, to rotate about the rotary shaft as a unit. The suspension bracket 408 and yoke assembly 412 are fixed to the cart during operation to retain the magnet rotors 416 in a fixed vertical position relative to the cart.

The magnet rotors 416 are fixed to the remainder of the drive system 400 by a rigid frame 424 and a cross member 426. The cross member 426 extends transversely between the two opposing sliding carriages 406, and is attached to the frame 424 at a central location along the width of the drive system 400. The cross member 426 is rigidly fixed to the frame 424 and the frame is rigidly fixed to the shaft 418, maintaining a fixed physical relationship between the three elements. The inventors appreciate that the drive rail system 402 could be positioned at other locations along the width of the support rail system 404, and thus the magnet rotors 416 could be attached to the cross member at other locations, or could be configured to not incorporate a cross member at all.

A motor 428 is mounted on the frame 424, and is connected to the magnet rotors 416 by a belt 430. The belt 430 can have teeth for engaging complementary teeth on a pulley 432 (FIG. 19) on the motor 428 and sheave 434 (FIG. 19) on the magnet rotors 416, to reduce the likelihood of slippage in the system. A control system 436 is coupled to the motor to controllably drive the magnet rotors 416 during operation.

Each magnet rotor 416 has several permanent magnets 420 positioned circumferentially about its perimeter. As discussed above, the magnet rotors 416 are positioned on such that a lower portion of the rotors falls within the drive rail system 402. The illustrated drive rail system 402 incorporates three parallel conductor rails 438, each made from a electroconductive material, such as aluminum.

The sliding carriages 406 on opposing ends of the cross member 426 are coupled to the cart by transverse shafts 440, such as that shown and described in connection with FIG. 15 in a previous embodiment. As discussed in detail there, the sliding carriages 406 allow the attached system to float transversely as the cart moves laterally with respect to the track, which in this case, allows the magnet rotors 416 to maintain a desired position relative to the conductor rails 438. Movement of the drive system 400 relative to the cart can be appreciated by reviewing FIG. 16.

The embodiment illustrated in FIGS. 18 and 19 incorporates three parallel conductor rails 438 positioned centrally along the width of the track. The magnet rotors 416 are interwoven between the conductor rails 438. As a result, each permanent magnet 420 operates on both adjacent conductor rails 438 to effectively generate twice the acceleration or deceleration forces possible were there only one conductor rail. In the illustrated embodiment, the two magnet rotors 416 operate simultaneously on three conductor rails 438—each rotor positioned between two rails—which effectively quadruples the forces generated by a single rotor and a single rail. The fixed relative positioning of the support rail system 404 and the conductor rails 438 maintains the magnet rotors 416 in working alignment between the respective conductor rails. The inventors appreciate that many different configurations could be used to increase the force with which the rotors accelerate and decelerate the cart, and that the conductor rails could be located at any point along the width of the track, or even outside the track.

Figure 20:
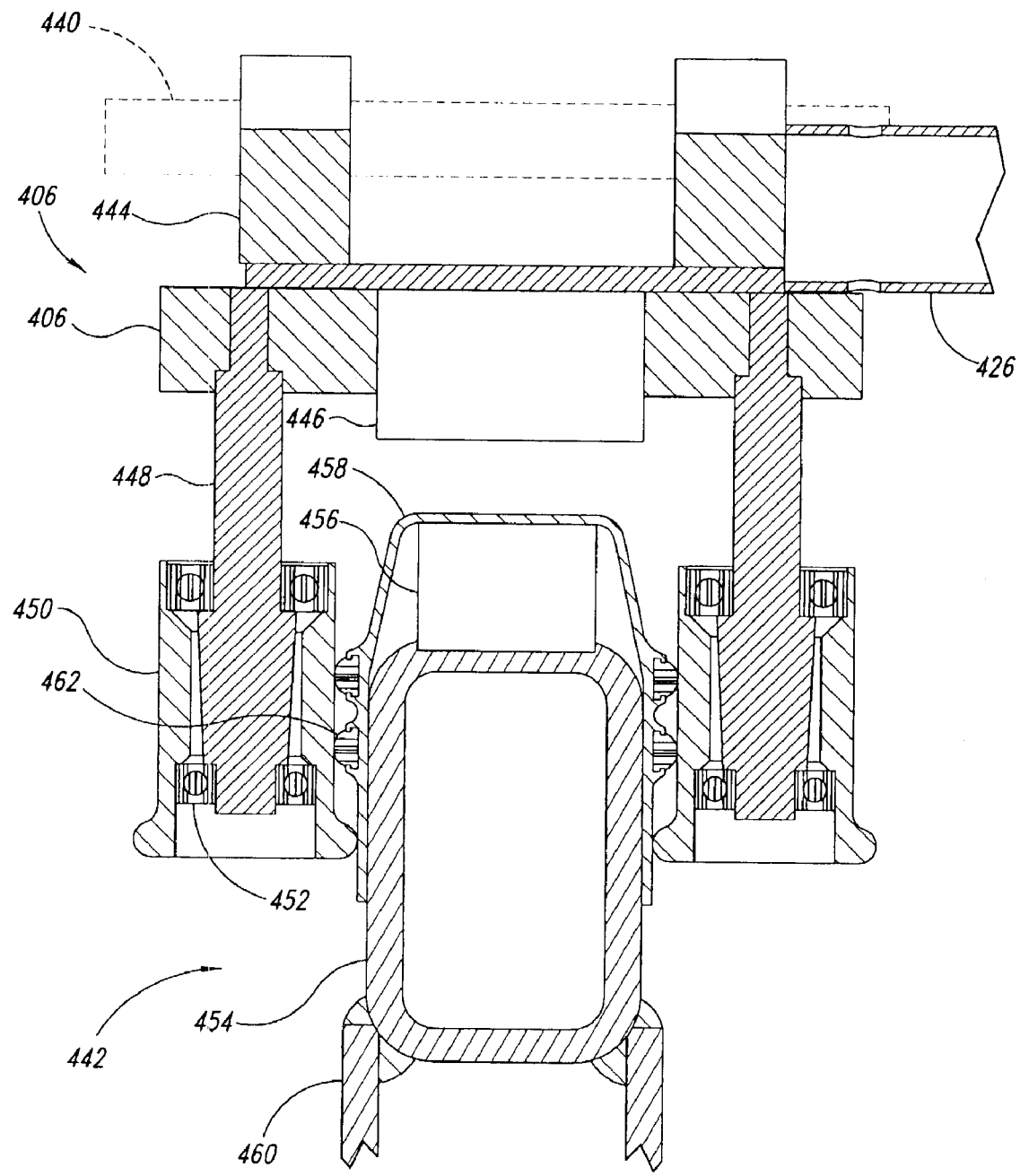
FIG. 20 is a cross-sectional elevation view along a longitudinal axis of the section of track and the drive system of FIG. 18.
Figure 21:
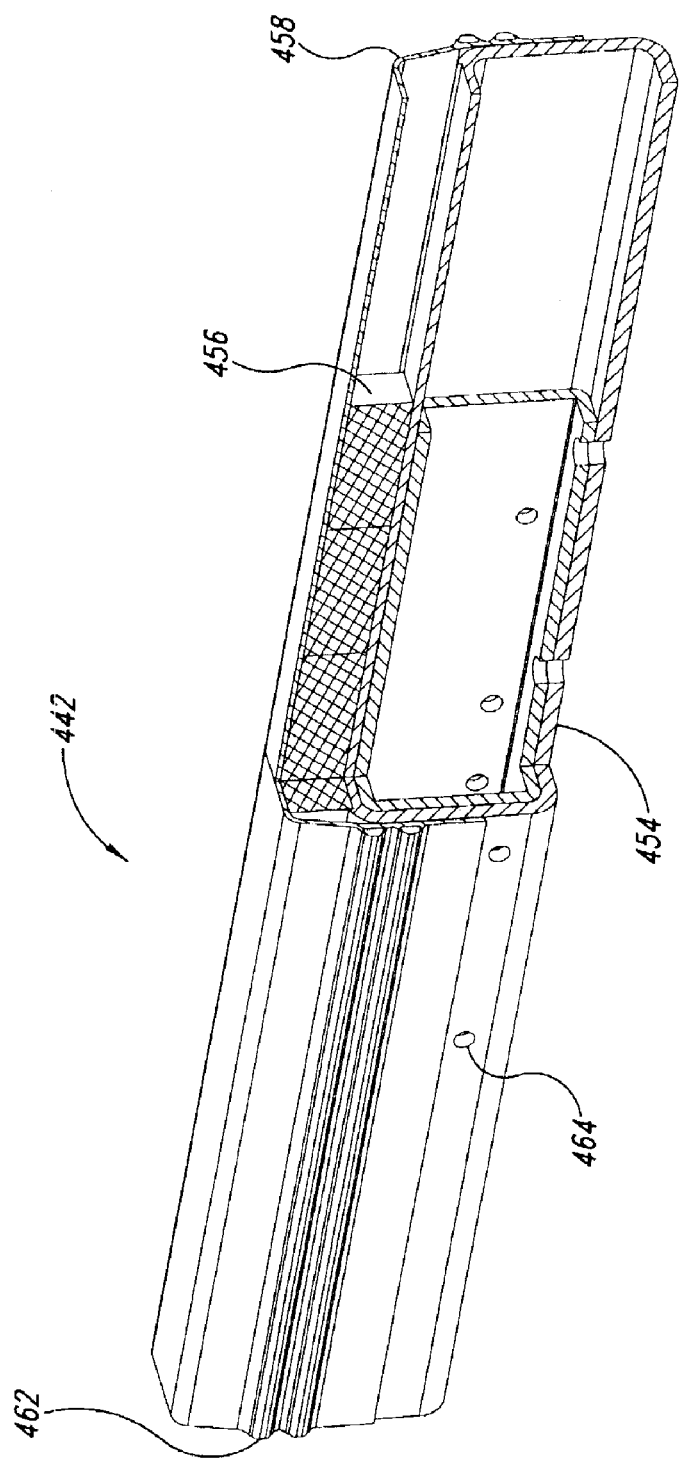
FIG. 21 is an isometric view of a portion of a length of rail, having a portion cut away.

FIGS. 20 and 21 illustrate the sliding carriage 406 and one support rail 442 from the support rail system 404. Similar to the sliding carriage 300 described above, the sliding carriage 406 incorporates upper arms 444, an upper permanent magnet 446, guide rods 448 and guide rollers 450. The upper arms 444 retain the transverse shafts 440, and allow the sliding carriage 406 to move laterally with respect to the cart. To facilitate this movement, the coupling between the two members can incorporate bushings or other friction-reducing elements. The guide rods 448 extend downward on opposing sides of the support rail 442 during operation, and the guide rollers 450 are mounted to the guide rods, by compression bearings 452 or the like. As such, the guide rollers 450 are free to rotate about the guide rods 448, reducing the forces between the sliding carriage 406 and the support rail 442 during operation.

The support rail 442 can be formed in lengths as a pre-fabricated assembly incorporating a base 454, a row of permanent magnets 456 and a cover 458. As such, the lengths of support rail 442 can be fabricated in a shop, and can then be simply dropped in place and mounted, such as to a new structure or foundation, or to an existing train track. In the illustrated embodiment, the support rail 442 is welded to a lower support member 460. The inventors appreciate that the support rail 442 can be fabricated and installed in other manners, without deviating from the spirit of the invention.

The body 454 in the illustrated embodiment is a rectangular section of structural steel, and as such, it serves as a ferrous keeper, similar to those discussed above. It is understood that the system could incorporate a separate ferrous backing plate positioned between the base 454 and the permanent magnets 456, but such a configuration would require additional materials and labor to fabricate. The illustrated base 454 is rectangular in cross-section, having its major axis extending vertically to provide maximum bending resistance. It is appreciated that the size, shape, orientation and other details of the base 454 could vary, as illustrated in FIG. 22, without deviating from the spirit of the invention.

The cover 458 of the illustrated embodiment is shaped to extend over the permanent magnet 456 from one side of the base 454 to the opposing side. As such, the cover 458 can assist in retaining the permanent magnets 456 in their desired location and alignment. Further, the cover 458 can prevent oil, debris or other foreign matter from contacting the permanent magnets 456. The external side surface of the cover 458 can have Teflon glides 462 or other features to further reduce the effect of friction between the support rail 442 and the guide rollers 450.

As illustrated in FIG. 21, sections of the support rail 442 can be fabricated as unitary assemblies, and can then be installed in the filed by contractors who merely mount the support rail sections to a structure or existing train track. The support rail 442 can be fabricated in the shop with features, such as bolt holes 464, to facilitate mounting the sections in the field. These features can reduce the time and cost of installation, by allowing much of the critical fabrication tasks to be performed in a factory environment instead of the field; for example, the compression of the permanent magnets 456, which as discussed above may require significant forces to urge the adjacent magnets together and retain them in place. Such projects can typically be performed much quicker and more efficiently in a factory setting.

Figure 22:
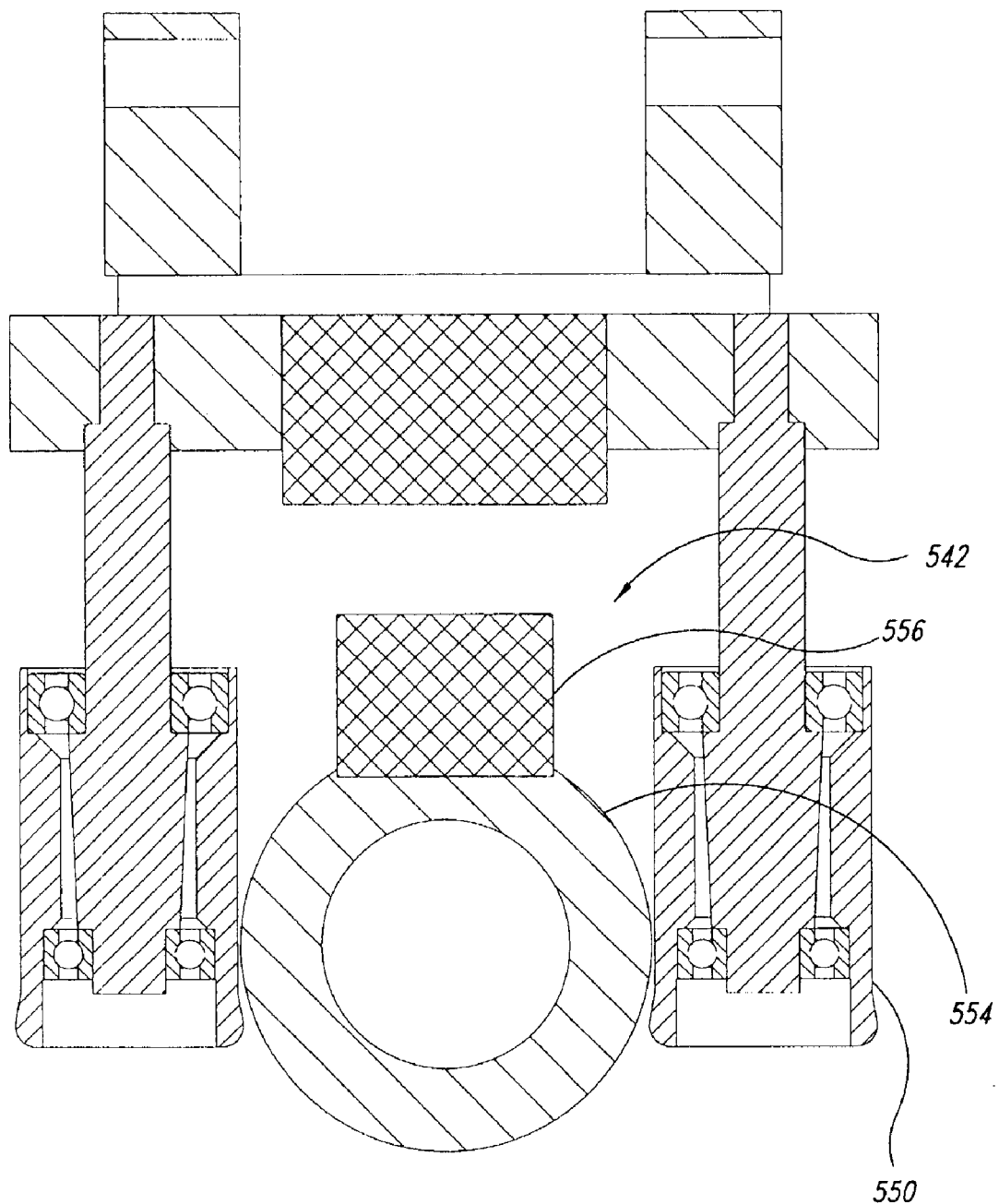
FIG. 22 is a cross-sectional elevation view along a longitudinal axis of an alternate embodiment of the track and the drive system.

FIG. 22 illustrates an alternate embodiment of a support rail 542, incorporating a base 554 and a permanent magnet 556. In this particular embodiment, the base 554 is fabricated from a pipe having a circular cross-section. With such a configuration, the support rail 542 may be fabricated without side glides, and to reduce friction in the system, the base 554 may be coated with friction-reducing paint or other coatings. The cross-sectional shape of the base 554 inherently causes it to contact the guide rollers 550 at a small area, further reducing friction between the adjacent elements.

Figure 23:
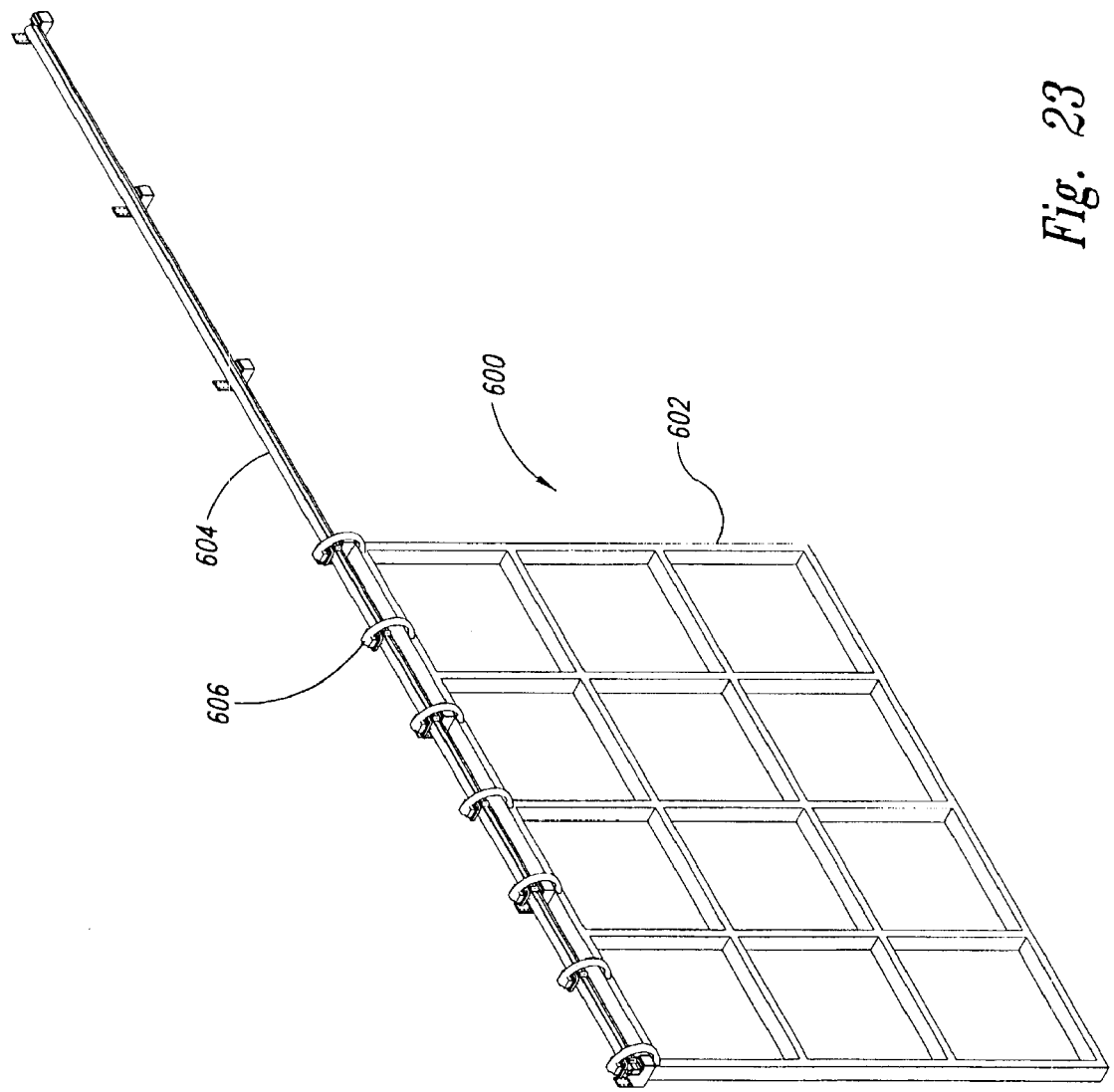
FIG. 23 is an isometric view of a track and a door panel according to one particular embodiment of the present invention.
Figure 24:
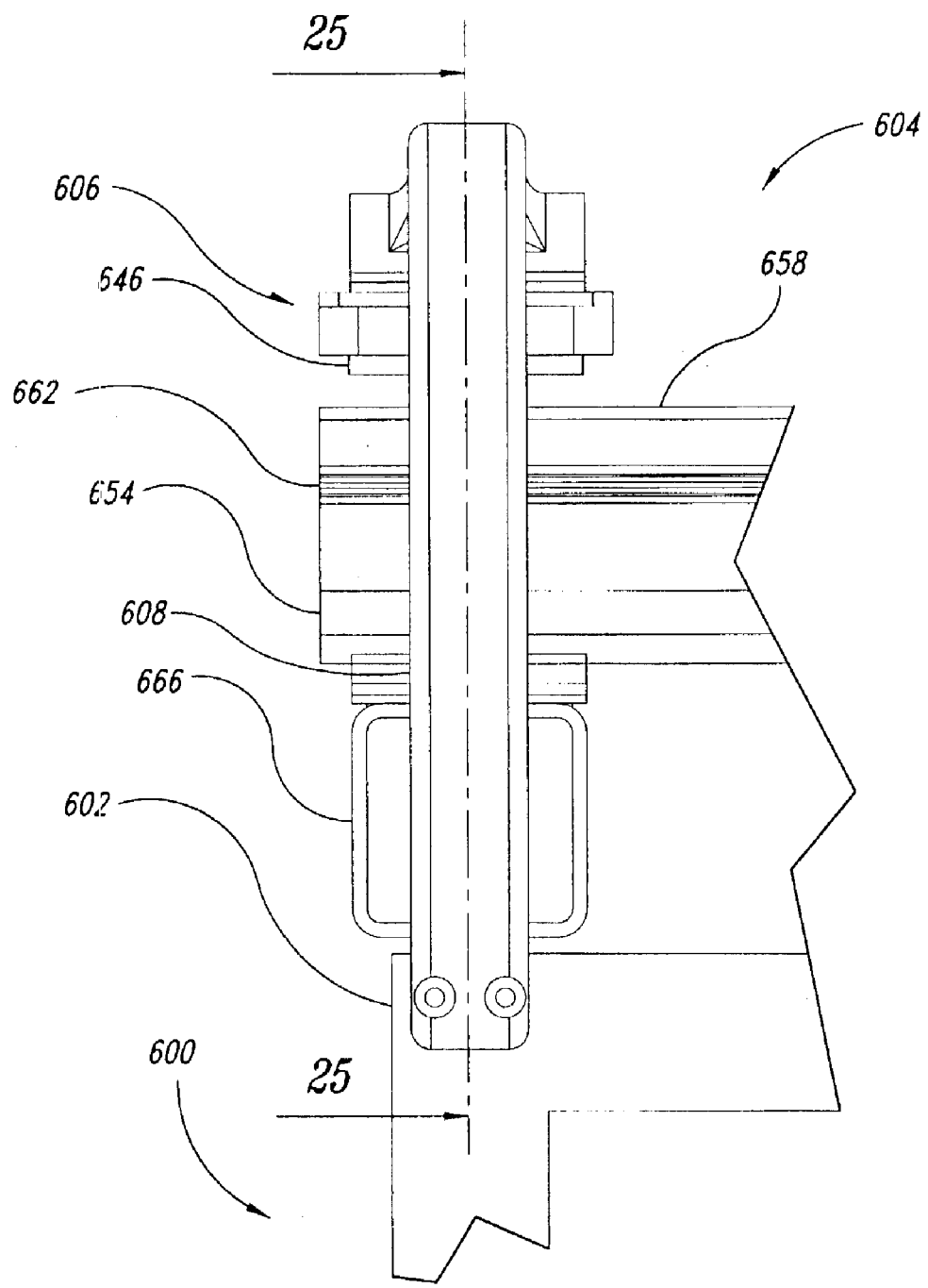
FIG. 24 is an enlarged elevation view of a portion of the door panel and track of FIG. 23.
Figure 25:
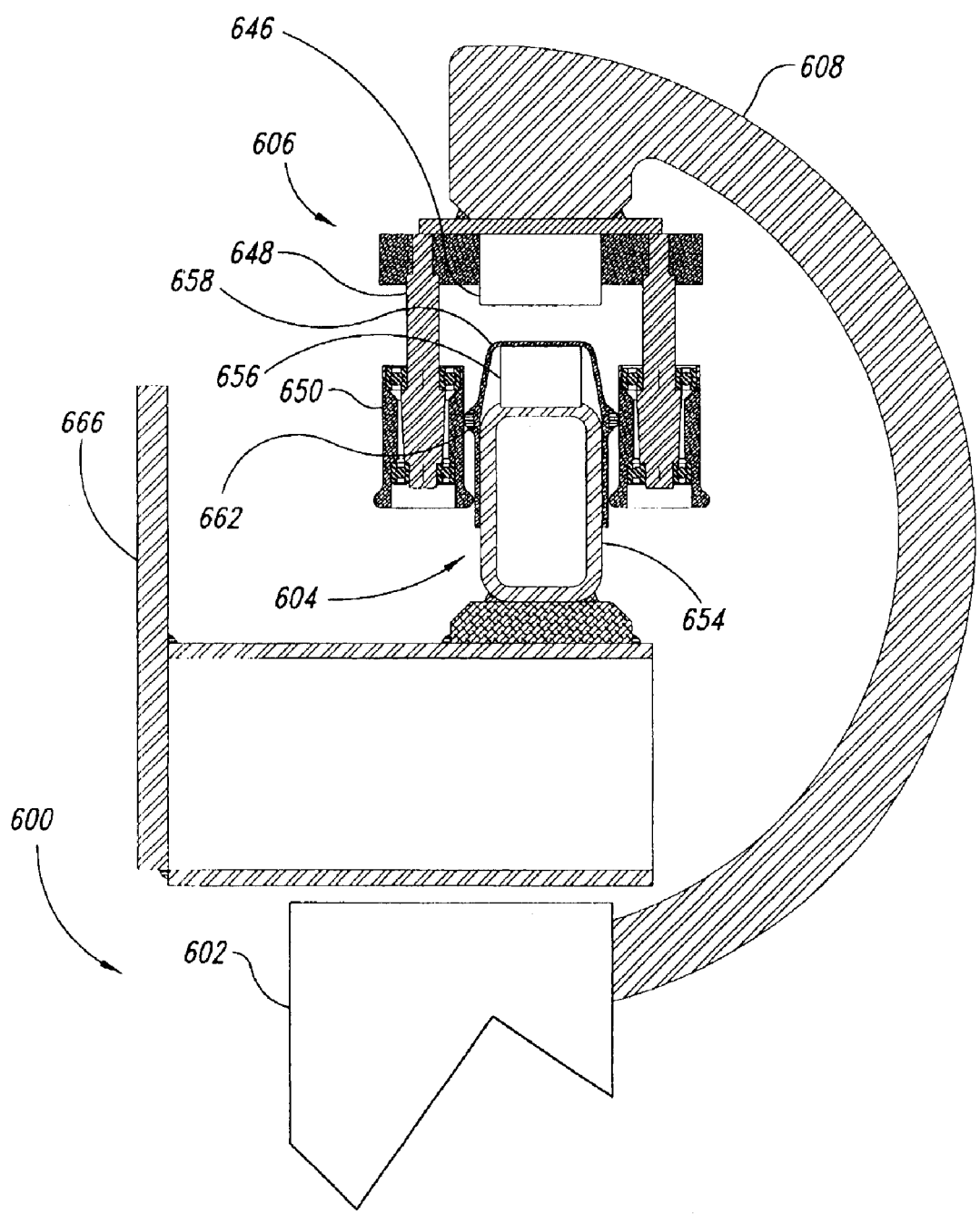
FIG. 25 is a cross-sectional view of the track and door panel of FIG. 23, viewed along Section 25—25 of FIG. 24.

FIGS. 23–25 illustrate a door/window system 600 according to one particular embodiment of the present invention. The system 600 incorporates a door 602 or window or the like, suspended from and configured to slidably open and close along a track 604. The door 602 could be any type of door for a warehouse, hangar or other structure, but the present invention would be particularly useful on heavy doors due to the invention's inherent friction-reducing features.

The track 604 can be configured in a manner similar to one of the rails or tracks described above or illustrated in the corresponding figures. As illustrated in FIG. 25, the illustrated track 604 is equivalent to that shown in FIG. 20, with a base 654, permanent magnets 656, a cover 658, and glides 662. The track can be mounted to a wall or ceiling with fasteners, such as bracket 666.

The door 602 is suspended from the track 604 by a number of carriages 606. Similar to the sliding carriages discussed above, the carriages 606 incorporate an upper magnet 646, guide rods 648 and guide rollers 650, to allow the carriage to move smoothly along the length of the track 604 with minimal friction.

The door 602 is attached to the carriages 606 by curved linkages 608 that are configured to suspend the door directly under the track. Thus, the weight of the door 602 can exert a downward force on the carriages 606, without necessarily creating any torque. As such, the carriages 606 can be designed to merely support the downward weight of the door 602. The number of carriages 606 used to support the door 602 can be based on the weight of the door, the number and size of upper magnets 646 in each carriage, and the force exerted by each magnet. The illustrated carriages 606 are spaced apart evenly along the length of the door in the direction of the track 604.

The applicant appreciates that many modifications and variations can be made to the embodiments discussed above without diverging from the spirit of the invention. For example, carts can be fabricated with one, two or more driving discs to independently or collectively accelerate and decelerate the cart in the forward and reverse directions. Likewise, more or fewer supporting rails can be incorporated to modify the levitation forces and weight distribution characteristics of a particular system. As discussed above, the driving disc and third rail can be positioned in other locations, such as above the cart for "suspended" configurations. Other modifications and variations would be apparent to those of ordinary skill in the art. Accordingly, the scope of the invention should be interpreted only based on the claims below.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A system for use in moving people or cargo, the system comprising:
   a track having a length;
   an object configured to travel along the track;
   a drive rail system comprising at least one electroconductive rail extending along the length of the track; and
   at least one driving disc coupled to the object to rotate about a rotary axis with respect to the object, the at least one driving disc having a plurality of permanent magnets spaced about the rotary axis, the at least one driving disc being positioned with a portion thereof in close proximity to the electroconductive rail and being controllably rotatable in the presence of the electroconductive rail to create an eddy current therebetween to accelerate and decelerate the object with respect to the track;

wherein the at least one driving disc is adapted to be movable during operation in a transverse direction relative to the object, and the driving disc is coupled to the track to maintain a substantially fixed distance between the driving disc and the track, such that the transverse position of the at least one driving disc with respect to the object can change during operation to maintain a desired alignment between the at least one driving disc and the electroconductive rail.

2. The system of claim 1 wherein the at least one driving disc is spaced apart from the track by a rigid linkage sized to maintain the at least one driving disc in a desired element with the drive rail system.

3. The system of claim 1 wherein the at least one driving disc is spaced apart from the track by a rigid linkage size to maintain the at least one driving disc in a desired alignment with the drive rail system, the rigid linkage being configured to generate a reduced amount of friction against the track.

4. The system of claim 1 wherein the object comprises a vehicle.

5. The system of claim 1 wherein the object comprises a train car.

6. The system of claim 1 wherein the object comprises a freight carrier.

7. The system of claim 1 wherein the object comprises a door.

8. The system of claim 1 wherein the object comprises a window.

9. The system of claim 1 wherein the at least one driving disc is centrally located with respect to a width of the object.

10. A system for use in moving people or cargo, the system comprising:
a track having a length;
an object configured to travel along the track;
a drive rail system comprising at least one electroconductive rail extending along the length of the track;
at least one driving disc coupled to the object to rotate about a rotary axis with respect to the object, the at least one driving disc having a plurality of permanent magnets spaced about the rotary axis, the at least one driving disc being positioned with a portion thereof in close proximity to the electroconductive rail and being controllably rotatable in the presence of the electroconductive rail to create an eddy current therebetween to accelerate and decelerate the object with respect to the track;
wherein the at least one driving disc is slidably coupled to the object to move in a transverse direction relative to the object.

11. A system for use in moving people or cargo, the system comprising:
a track having a length;
an object configured to travel along the track;
a drive rail system comprising a plurality of electroconductive rails extending along the length of the track; and
at least one driving disc coupled to the object to rotate about a rotary axis with respect to the object, the at least one driving disc having a plurality of permanent magnets spaced about the rotary axis, the at least one driving disc being positioned with a portion thereof in close proximity to the electroconductive rails and being controllably rotatable in the presence of the electroconductive rails to create an eddy current therebetween to accelerate and decelerate the object with respect to the track;
wherein a total number of the electroconductive rails is one greater than a total number of the driving discs and wherein each of the driving discs is positioned between a pair of the electroconductive rails.

12. A vehicle for transporting people or cargo, along a track having at least one support rail configured to support and guide the vehicle and at least one electroconductive drive rail extending parallel to the support trail, the electroconductive drive rail being positioned at a fixed elevation with respect to the support rail, the vehicle comprising:
at least one driving disc coupled to the vehicle to rotate with respect to the vehicle about a rotary axis, the rotary axis being at least substantially perpendicular to a desired direction of vehicular travel, the at least one driving disc having a plurality of permanent magnets spaced apart from and about the rotary axis, the at least one driving disc being positioned on the vehicle such that a portion of the at least one driving disc is at least proximate the fixed elevation during operation, the at least one driving disc being movable coupled to the vehicle to controllably move transversely with respect to the vehicle such that the at least one driving disc can be maintained in a desired relationship with respect to the electroconductive drive rail during operation;
wherein the at least one driving disc is coupled to at least one rigid linkage having at least one roller at its distal end, the roller being apart from the at least one driving disc by a predetermined distance such that the roller contacts the support rail during operation, and such that the at least one driving disc remains a fixed distance from the support rail during operation to maintain the desired relationship.

13. The vehicle of claim 12 wherein the rigid linkage has a pair of rollers at its distal end, the rollers being spaced apart from the at least one driving disc by a predetermined distance such that the rollers contact opposing sides of the support rail during operation, and such that the at least one driving disc remains a fixed distance from the support rail during operation to maintain the desired relationship.

14. The vehicle of claim 12 wherein the at least one driving disc is coupled to two opposing rigid linkages each having a roller at its distal end, the rollers being spaced apart from the at least one driving disc by a predetermined distance such that the rollers contact the opposing support rails during operation, and such that the at least one driving disc remains a fixed distance from the support rail during operation to maintain the desired relationship.

15. The vehicle of claim 12 wherein the at least one driving disc is coupled to two opposing rigid linkages each having a pair of rollers at its distal end, the pairs of rollers being spaced apart from the at least one driving disc by a predetermined distance such that the rollers contact opposing sides of the opposing support rails during operation, and such that the at least one driving disc remains a fixed distance from the support rail during operation to maintain the desired relationship.

* * * * *